US012463978B1

(12) United States Patent
Chebolu et al.

(10) Patent No.: US 12,463,978 B1
(45) Date of Patent: Nov. 4, 2025

(54) PROVIDING INFORMATION SECURITY TO AN ENTITY BY DETECTING IMPOSSIBLE TRAVEL EVENTS ACROSS MULTIPLE CLOUD-BASED APPLICATION SERVICES

(71) Applicant: Obsidian Security, Inc., Newport Beach, CA (US)

(72) Inventors: Naresh Chebolu, Irvine, CA (US); Marcus McCurdy, Haddon Township, NJ (US)

(73) Assignee: Obsidian Security, Inc., Newport Beach, CA (US)

( * ) Notice: Subject to any disclaimer, the term of this patent is extended or adjusted under 35 U.S.C. 154(b) by 294 days.

(21) Appl. No.: 18/113,983

(22) Filed: Feb. 24, 2023

Related U.S. Application Data

(60) Provisional application No. 63/313,566, filed on Feb. 24, 2022.

(51) Int. Cl.
H04L 9/40 (2022.01)
(52) U.S. Cl.
CPC .......... *H04L 63/107* (2013.01); *H04L 63/105* (2013.01); *H04L 63/1441* (2013.01)
(58) Field of Classification Search
CPC .. H04L 63/107; H04L 63/105; H04L 63/1441
USPC .......................................................... 726/4
See application file for complete search history.

(56) References Cited

U.S. PATENT DOCUMENTS

| | | | |
|---|---|---|---|
| 9,529,990 B2 | 12/2016 | Newstadt et al. |
| 9,680,938 B1 | 6/2017 | Gil et al. |
| 9,836,598 B2 | 12/2017 | Iyer et al. |
| 10,291,638 B1 | 5/2019 | Chandana et al. |
| 10,552,728 B2 | 2/2020 | Oliner et al. |
| 10,841,338 B1 | 11/2020 | Lin et al. |
| 10,885,165 B2 | 1/2021 | Zhan et al. |
| 10,887,325 B1 | 1/2021 | Lin et al. |
| 10,931,699 B2 | 2/2021 | Wolff et al. |
| 10,944,777 B2 | 3/2021 | Lin et al. |
| 11,025,653 B2 | 6/2021 | Faigon et al. |

(Continued)

FOREIGN PATENT DOCUMENTS

EP 3800856 A1 4/2021

*Primary Examiner* — Aubrey H Wyszynski
(74) *Attorney, Agent, or Firm* — COOLEY LLP

(57) ABSTRACT

For an entity having access to a plurality of independent cloud-based applications and including a member having access to at least one cloud-based application from the plurality of independent cloud-based applications via at least one member account associated with the at least one cloud-based application, a plurality of activities performed using the at least one member account can be analyzed with at least one machine learning model configured to flag an activity of an activity type from the plurality of activities in response to (1) the activity being associated with a geolocation outside a trusted geolocation cluster at an entity level for the entity, a trusted geolocation cluster at an activity level for the activity type, and/or a trusted geolocation cluster at a member level for the member, or (2) the activity being associated with an internet service provider (ISP) that is not recognized as being (a) a trusted ISP at the entity level for the entity, (b) a trusted ISP at the activity level for the activity type, and/or (c) a trusted ISP at the member level for the member.

20 Claims, 13 Drawing Sheets

(56) References Cited

U.S. PATENT DOCUMENTS

| | | | |
|---|---|---|---|
| 2006/0212931 A1* | 9/2006 | Shull | H04L 63/104 |
| | | | 726/10 |
| 2017/0063905 A1 | 3/2017 | Muddu et al. | |
| 2018/0098230 A1* | 4/2018 | Obaidi | H04W 4/08 |
| 2018/0219886 A1* | 8/2018 | Miron | H04L 63/1425 |
| 2018/0375822 A1* | 12/2018 | Dahlberg | H04L 51/48 |
| 2020/0304364 A1* | 9/2020 | Tapia | G06N 7/01 |
| 2021/0160813 A1* | 5/2021 | Gupta | H04W 24/08 |
| 2021/0409976 A1* | 12/2021 | Ergen | H04W 72/541 |

* cited by examiner

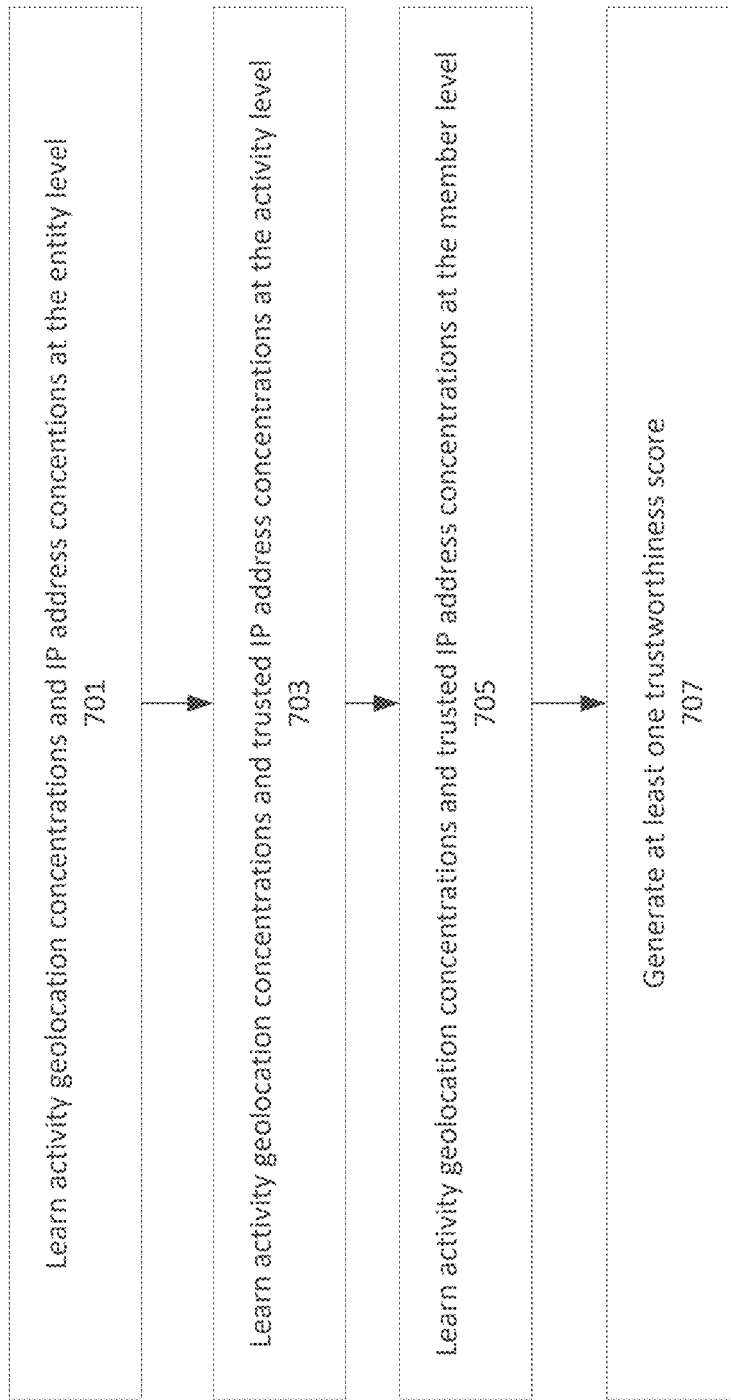

800

Determine (1) activity geolocation concentrations at an entity level and (2) IP address concentrations at the entity level for an entity having access to a plurality of independent cloud-based applications 801

↓

Determine, for each activity type from a plurality of activity types performed at the plurality of independent cloud-based applications and associated with the entity, (1) activity geolocation concentrations at an activity level for that activity type and (2) IP address concentrations at the activity level for that activity type 803

↓

Determine, for each member from a plurality of members associated with the entity, (1) activity geolocation concentrations at a member level for that member and (2) IP address concentrations at the member level for that member 805

↓

Generate at least one trustworthiness score for an activity, having an activity type and associated with a member from the plurality of members, based on: (1) a geolocation associated with the activity; (2) at least one of the activity geolocation concentrations at the entity level, the activity geolocation concentrations at the activity level for the activity type, or the activity geolocation concentrations at the member level for the member; (3) an IP address associated with the activity; (4) an ISP associated with the IP address; and (5) at least one of the IP address concentrations at the entity level, the IP address concentrations at the activity level for the activity type, or the IP address concentrations at the member level for the member 807

↓

In response to the at least one trustworthiness score being outside a predetermined range, send an instruction to cause a remedial action in at least one of a network associated with the entity, an application from the plurality of independent cloud-based applications, or a compute device of a member associated with the entity 809

Learn activity geolocation concentrations at an entity level and trustworthiness for a set of internet service providers (ISPs) at the entity level for an entity having access to a plurality of independent cloud-based applications 901

Learn, for each activity type included in a plurality of activity types and performed by at least one member account associated with (1) the entity and (2) at least one cloud-based application from the plurality of independent cloud-based applications, activity geolocation concentrations at an activity level for that activity type and trustworthiness for the set of ISPs at the activity level for that activity type 903

Learn, for each member from a plurality of members associated with the entity, (1) activity geolocation concentrations at a member level associated with that member and (2) trustworthiness for the set of ISPs at the member level associated with that member 905

Generate a set of trustworthiness scores for an activity, having an activity type included in the plurality of activity types and associated with a member from the plurality of members, based on (1) a geolocation associated with the activity, (2) at least one of the activity geolocation concentrations at the entity level, the activity geolocation concentrations at the activity level for the activity type, or the activity geolocation concentrations at the member level associated with the member, (3) an IP address associated with the activity, (4) an ISP associated with the IP address, and (5) at least one of the trustworthiness for the set of ISPs at the entity level, the trustworthiness for the set of ISPs at the activity level for the activity type, or the trustworthiness for the set of ISPs at the member level associated with the member 907

For an entity having access to a plurality of independent cloud-based applications and including a member having access to at least one cloud-based application from the plurality of independent cloud-based applications via at least one member account associated with the at least one cloud-based application, analyze a plurality of activities performed using the at least one member account with at least one machine learning model configured to flag a first activity of a first activity type from the plurality of activities in response to at least one of (1) the first activity being associated with a geolocation outside at least one of (a) a trusted geolocation cluster at an entity level for the entity, (b) a trusted geolocation cluster at a member level for the member, or (2) the first activity being associated with an internet service provider (ISP) not recognized as being at least one of (a) a trusted ISP at the entity level for the entity, (b) a trusted ISP at the activity level for the first activity type, or (c) a trusted ISP at the member level for the member 1001

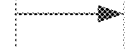

In response to the at least one machine learning model flagging the first activity, verify that the first activity occurred over a period of time and distance relative to at least one of (1) a second activity from the plurality of activities performed before the first activity, or (2) a third activity from the plurality of activities performed after the first activity that is above a predetermined speed threshold 1003

FIG. 9

PROVIDING INFORMATION SECURITY TO AN ENTITY BY DETECTING IMPOSSIBLE TRAVEL EVENTS ACROSS MULTIPLE CLOUD-BASED APPLICATION SERVICES

CROSS REFERENCE TO RELATED APPLICATION

This application claims the benefit U.S. Provisional Patent Application No. 63/313,566, filed Feb. 24, 2022 and entitled "PROVIDING INFORMATION SECURITY TO AN ENTITY BY DETECTING IMPOSSIBLE TRAVEL EVENTS ACROSS MULTIPLE CLOUD-BASED APPLICATION SERVICES," which is incorporated by reference in its entirety.

FIELD

In one or more embodiments, impossible travel events can be detected across multiple cloud-based application services to provide information security for cloud-based accounts for an entity using multiple cloud-based application services.

BACKGROUND

Entities, such as schools and businesses, often use a myriad of independent cloud-based application services. Members of these entities can each have one or more accounts to access these myriad of independent cloud-based application services. If compromised, however, each of these accounts can pose a security risk for the associated entity.

One indicator that an account may be compromised is the detection of activity associated an account occurring in two distinct geographic locations over a time window that would be impossible for a human to travel between (i.e., impossible travel). The distributed nature of these cloud-based application services, however, can make identifying such impossible travel events very complex. Examples of impediments or issues when attempting to detect impossible travel events in a multiple cloud-based environment include virtual private networks (VPNs), satellite offices, variations in internet protocol (IP) address reporting by service, differences in distributions of mobile devices compares to laptops, and automated applications running on behalf of users amongst other issues.

BRIEF DESCRIPTION OF THE DRAWINGS

FIG. 4B shows flowchart of a method for identifying trusted internet service provider (ISP) clusters, according to an embodiment.

FIG. 6 shows a flowchart of a method for generating at least one trustworthiness score, according to an embodiment.

FIG. 7 shows a flowchart of a method to generate a trustworthiness score for an activity based on a geolocation associated with the activity and an IP address associated with the activity, according to an embodiment.

FIG. 8 shows a flowchart of a method to generate a set of trustworthiness scores for an activity based on a geolocation associated with the activity and an IP address associated with the activity, according to an embodiment.

FIG. 9 shows a flowchart of a method to detect impossible travel events using trusted geolocation clusters and trusted ISPs, according to an embodiment.

SUMMARY

Figure 1A:
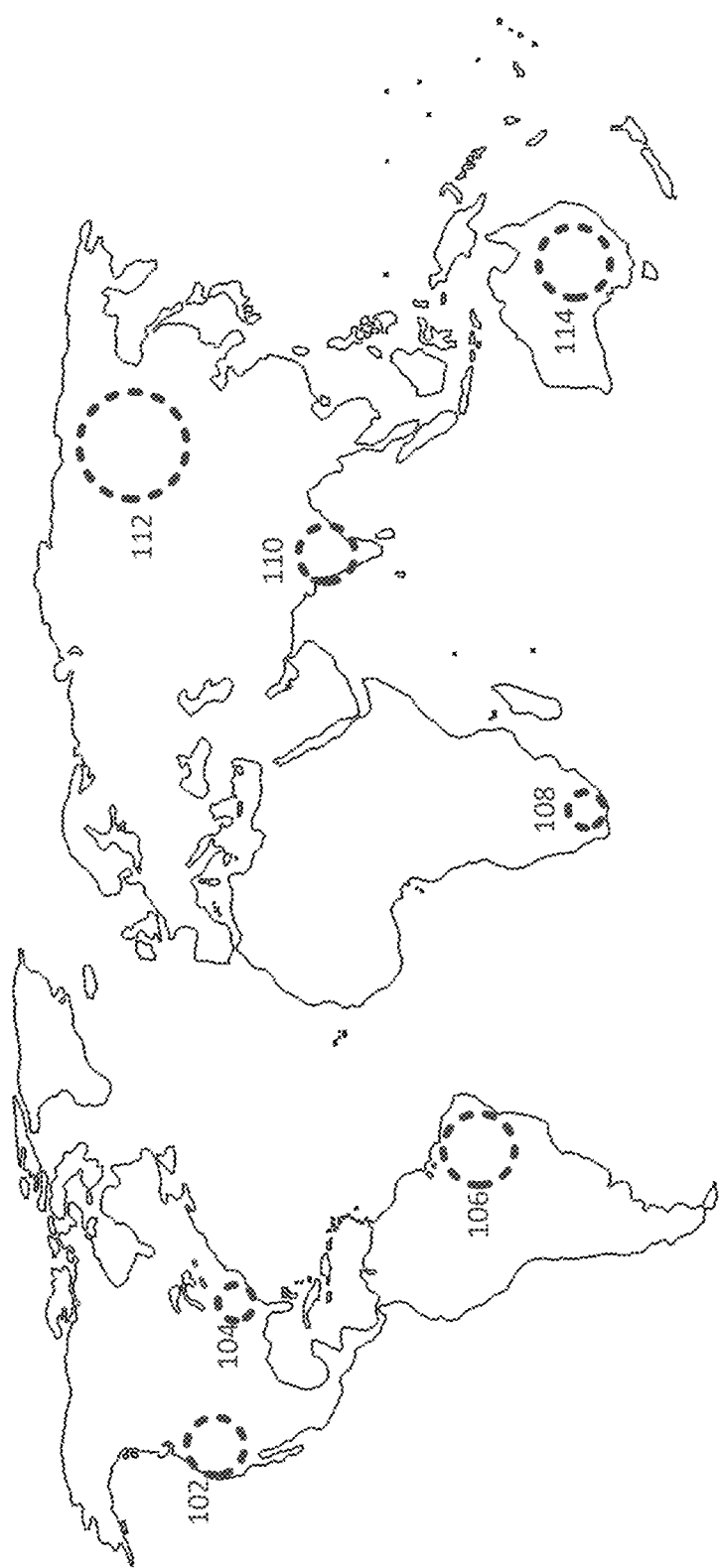
FIG. 1A shows an example of trusted geolocations at the entity level, according to an embodiment.

In an embodiment, a method comprises determining (1) activity geolocation concentrations at an entity level and (2) IP address concentrations at the entity level for an entity having access to a plurality of independent cloud-based applications. For each activity type from a plurality of activity types performed at the plurality of independent cloud-based applications and associated with the entity, (1) activity geolocation concentrations at an activity level for that activity type and (2) IP address concentrations at the activity level for that activity type are determined. For each member from a plurality of members associated with the entity, (1) activity geolocation concentrations at a member level for that member and (2) IP address concentrations at the member level for that member are determined. At least one trustworthiness score is generated for an activity, having an activity type and associated with a member from the plurality of members, based on: (1) a geolocation associated with the activity; (2) at least one of the activity geolocation concentrations at the entity level, the activity geolocation concentrations at the activity level for the activity type, or the activity geolocation concentrations at the member level for the member; (3) an IP address associated with the activity; (4) an ISP associated with the IP address; and (5) at least one of the IP address concentrations at the entity level, the IP address concentrations at the activity level for the activity type, or the IP address concentrations at the member level for the member. In response to the at least one trustworthiness score being outside a predetermined range, an instruction is sent to cause a remedial action in at least one of a network associated with the entity, an application from the plurality of independent cloud-based applications, or a compute device of a member associated with the entity. In an embodiment, a non-transitory medium stores code representing instructions to be executed by one or more processors. The instructions comprise code to cause the one or more processors to learn activity geolocation concentrations at an entity level and trustworthiness for a set of internet service providers (ISPs) at the entity level for an entity having access to a plurality of independent cloud-based applications. The instructions further comprise code to cause the one or more processors to learn, for each activity type included in a plurality of activity types and performed by at least one member account associated with (1) the entity and (2) at least one cloud-based application from the plurality of independent cloud-based applications, activity geolocation concentrations at an activity level for that activity type and trustworthiness for the set of ISPs at the activity level for that activity type. The instructions further comprise code to cause the one or more processors to learn, for each member from a plurality of members associated with the entity, (1) activity geolocation concentrations at a member level associated with that member and (2) trustworthiness for the set of ISPs at the member level associated with that member. The instructions further comprise code to cause the one or more processors to generate a set of trustworthiness scores for an activity, having an activity type included in the plurality of activity types and associated with a member from the plurality of members, based on (1) a geolocation associated with the activity, (2) at least one of the activity geolocation concentrations at the entity level, the activity geolocation concentrations at the activity level for the activity type, or the activity geolocation concentrations at the member level associated with the member, (3) an IP address associated with the activity, (4) an ISP associated with the IP address, and (5) at least one of the trustworthiness for the set of ISPs at the entity level, the trustworthiness for the set of ISPs at the activity level for the activity type, or the trustworthiness for the set of ISPs at the member level associated with the member.

In an embodiment, an apparatus comprises a memory and a processor operatively coupled to the memory. The processor is configured to, for an entity having access to a plurality of independent cloud-based applications and including a member having access to at least one cloud-based application from the plurality of independent cloud-based applications via at least one member account associated with the at least one cloud-based application, analyze a plurality of activities performed using the at least one member account with at least one machine learning model configured to flag a first activity of a first activity type from the plurality of activities in response to at least one of (1) the first activity being associated with a geolocation outside at least one of (a) a trusted geolocation cluster at an entity level for the entity, (b) a trusted geolocation cluster at an activity level for the first activity type, or (c) a trusted geolocation cluster at a member level for the member, or (2) the first activity being associated with an internet service provider (ISP) not recognized as being at least one of (a) a trusted ISP at the entity level for the entity, (b) a trusted ISP at the activity level for the first activity type, or (c) a trusted ISP at the member level for the member. The processor is further configured to, in response to the at least one machine learning model flagging the first activity, verify that the first activity occurred over a period of time and distance relative to at least one of (1) a second activity from the plurality of activities performed before the first activity, or (2) a third activity from the plurality of activities performed after the first activity that is above a predetermined speed threshold.

DETAILED DESCRIPTION

Entities, such as schools or companies, often use multiple cloud services, such as software as a service (SaaS) applications, infrastructure as a service (IaaS), platform as a service (PaaS), and network as a service (NaaS). Members of these entities can then use these cloud services to perform various activities. For instance, a member may utilize a first SaaS application to edit documents (e.g. Adobe®), a second SaaS application to send/receive emails (e.g., Outlook®), and a third SaaS application to host meetings (e.g., Zoom®). In such a case, the member will likely have a separate account(s) for each of the various SaaS applications, each of which can pose security risks if accessed by someone other than the member. For the sake of simplicity, the discussions herein will focus on SaaS applications, though can be appreciated that the techniques described herein can be applied to many types of cloud services (e.g., IaaS, PaaS, NaaS).

A security compute device can be leveraged that collects data from multiple SaaS applications used by an entity (e.g., all SaaS applications used by the entity). An entity can be, for example, a company or organization. The security compute device can then normalize the data received from different SaaS applications into a common format, allowing activities (and their associated attributes) performed by a member across different SaaS applications to be aggregated for additional analysis. In an embodiment, an activity can refer to any action performed by a member account of a cloud-based (e.g., SaaS) application used by the entity. Examples of activities can include sending a file, receiving a file, saving a file, deleting a file, editing a file, creating a file, opening a file, performing a search, making a call, and receiving a call. In an embodiment, attributes refer to any characteristic that can provide additional context about one or more activities. Examples attributes can include a timestamp, who (or what service) attempted/performed an action, who/what was the target of the action, all running applications, IP addresses, process status information, client machine identification, effect(s) of the activity on the target device/member account, inactive/active status of member accounts, member account roles, and/or member account granted permissions. Additional details related to this concept can be found in U.S. Pat. No. 10,931,699, the content of which an incorporated in its entirety herein. By knowing the different accounts that members of an entity have at different SaaS applications, as well as the specific activities that are performed across the different SaaS applications by the member, further analysis of these activities can lead to modeling around geolocation trust and ISP trust. Trusted geolocations and/or trusted ISPs can serve as indicators that an activity associated with that trusted geolocation and/or trusted ISP is not suspicious, while untrusted geolocations and/or untrusted ISPs can serve as indicators that an activity associated with that untrusted geolocation and/or untrusted ISP is suspicious, which can trigger additional actions to take place. Such modeling around determining trusted geolocations and ISPs can be leveraged (used or reused) across multiple different use cases, such as identifying impossible travel events in a multi-SaaS environment, as described further below.

A transition from a first activity to a second activity after the first activity can be considered anomalous if (1) the transition satisfies the speed threshold (e.g., the sequence of activities occurs in two distinct geographic locations over a time window that would be impossible for a human to travel between), and (2) either one of the geolocations of an activity is deemed untrustworthy. If an activity is deemed untrustworthy, and the transition to/from that activity satisfies the speed threshold, a greater chance exists that an impossible travel event has occurred (i.e., someone other than the member has access to that member's account at one or more SaaS applications from a different geolocation). The transition can be, for instance, a first activity performed in a first SaaS application, followed by a second activity performed in a second SaaS application different than the first.

In other words, the techniques discussed herein are not limited to detecting impossible travel events within a single SaaS application.

To determine whether an activity is deemed untrustworthy, machine learning (ML) models can be used. The ML models can be unsupervised, supervised, and/or semi-supervised. In some implementations, a first ML model can be used to determine a trustworthiness metric associated with an activity based on a geolocation associated with that activity, and/or a second ML model can be used to determine a trustworthiness metric associated with the activity based on an ISP associated with that activity. In some implementations, a first ML model can be used to determine if an activity falls outsides of a trusted geolocation cluster, and/or a second ML model can be used to determine if an IP address is associated with a trusted ISP (i.e., not associated with an untrustworthy ISP), either of which results in flagging the activity for further analysis. In some implementations, flagging the activity for further analysis can look like storing an indication of the activity in memory or queue such that when such an indication is stored the further analysis is triggered automatically (e.g., without human intervention). In some implementations, the first ML model and the second ML model are the same ML model (e.g., a single model that determines if an activity falls outside of a trusted geolocation cluster and if an IP address associated with the activity falls is associated with a trusted ISP). In some implementations, the first ML model and the second ML model are independent models (i.e., different models). Determining whether an activity falls outside the trusted geolocation cluster, has a trustworthiness score outside a predetermined range and/or is associated with a trusted ISP cluster can be performed at the entity level, the activity level, and the member level. Activities falling outside any of the clusters and/or having a trustworthiness score outside a predetermined range could indicate that the member's account performing these activities has been compromised.

Regarding geolocation clusters, in some implementations, a ML model can be used to determine if an activity performed by a member account of the entity is within a trusted geolocation cluster at the entity level, the activity level, and the member level. For geolocation clusters at the entity level, all activities performed by/for the entity across various SaaS applications (e.g., all SaaS applications used by the entity) can be associated with one or more geolocations (e.g., via an IP address, global positioning system (GPS) coordinates, wireless access point ID). An unsupervised density-based ML model (e.g., Density-based spatial clustering of applications with noise (DBSCAN)) can then analyze these various geolocations to identify clusters that represent trusted geolocation clusters for the entity (i.e., at the entity level). Thereafter, activities performed by any SaaS application member account associated with the entity and associated with a geolocation outside the trusted geolocation clusters at the entity level can be flagged for further analysis.

For example, FIG. 1A shows a world map with various trusted geolocation clusters 102, 104, 106, 108, 110, 112, 114 at the entity level for an entity. Activity detected outside any of the clusters 102, 104, 106, 108, 110, 112, 114 can be flagged for further analysis. In this example, the entity is an aerospace company with an engineering team, a business team, and a legal team. The engineering team is located at an office in the east coast of the United States (i.e., near cluster 104), the business team is located at an office in the west coast of the United States (i.e., near cluster 102), and the legal team is located at an office near Brazil (i.e., near cluster 106). A large volume of SaaS application-related activities are performed near the entity's three offices (e.g., sending emails via Microsoft Outlook, downloading documents from Dropbox, etc.), thus a density-based ML model can recognize the large amount of activity near such regions (i.e., clustering of activity) and generate clusters 102, 104, 106 accordingly.

Additionally, each of the three teams has multiple member accounts to use multiple SaaS applications, which run in various servers scattered all over the world. In this example, the engineering team uses engineering-related SaaS applications operating on servers in South Africa and India (i.e., near clusters 108, 110), thus the density-based ML model can recognize the large amount of activity near such regions and generate clusters 108, 110 accordingly. In addition, the business team uses business-related SaaS models operating on servers in India and Russia (i.e., near clusters 110, 112), thus the density-based ML model can recognize the large amount of activity near such regions and generate clusters 110, 112 accordingly. Furthermore, the legal team uses legal-related SaaS models operating on servers in Russia and Australia (i.e., near clusters 112, 114), thus the density-based ML model can recognize the large amount of activity near such regions and generate clusters 112, 114 accordingly. Any activities performed by a member account of the entity associated with geolocations outside any of the clusters 102, 104, 106, 108, 110, 112, 114 (e.g., Tokyo, Egypt, Alaska), can be flagged for further analysis.

For geolocation clusters at the activity level, a specific type of activity performed by member accounts of the entity can be linked to one or more geolocations. The type of activity can be fairly broad (e.g., sending an email, downloading a file), fairly narrow (e.g., sending an email to Russia between 9 PM EST-6 AM EST, downloading at least 50 files from Dropbox within an hour), or anywhere in between. A density-based ML model (e.g., DBSCAN) can then analyze these various geolocations to learn trusted geolocation clusters for that type of activity (i.e., at the activity level). Thereafter, if that type of activity is performed again but associated with a geolocation outside the trusted geolocation clusters for that type of activity, that specific activity can be flagged for further analysis. Such trusted geolocation clusters at the activity level can be made for each type of activity. For example, a first set of trusted geolocation clusters can be generated for all member accounts associated with the entity that downloaded a file from a SaaS application, a second set of trusted geolocation clusters can be generated for all member accounts associated with the entity that deleted a file from a SaaS application, and a third set of trusted geolocation clusters can be generated for all member accounts associated with the entity that attempted to open a specific type of file in a SaaS application.

Figure 1B:
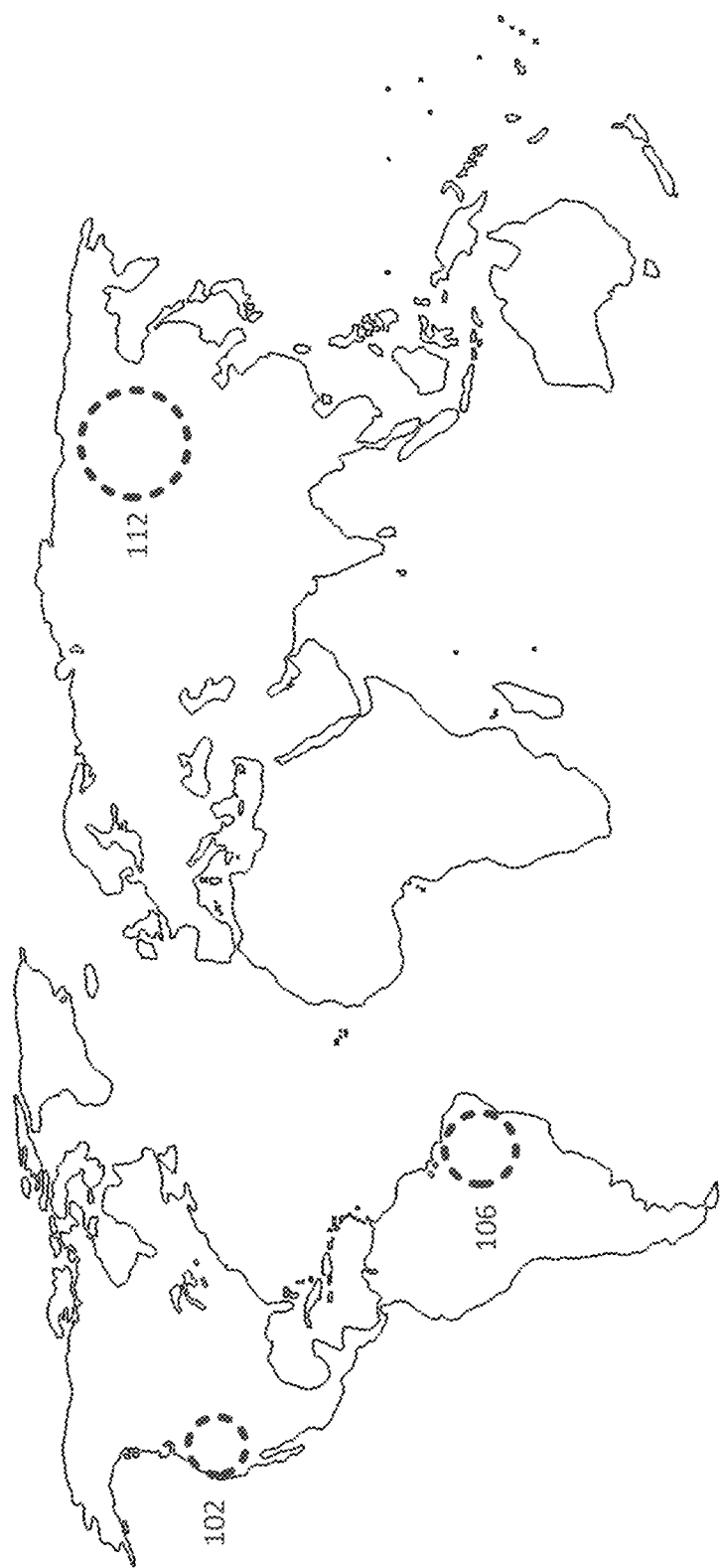
FIG. 1B shows an example of trusted geolocations at the activity level for a particular type of activity, according to an embodiment.

FIG. 1B is related to FIG. 1A, but shows trusted geolocation clusters at the activity level for one type of activity. If, for instance, the type of activity was downloading business contracts, the server storing the business contracts were located near cluster 112, and the downloading of these business contracts were performed by (a) member accounts associated with members of the business team located near cluster 102, and (b) member accounts associated with members of the legal team located near cluster 106, the activity type that is downloading business contracts will be dense near clusters 102, 106, 112. Thus, the density-based ML model can recognize the large amount of activity near such regions, and generate clusters 102, 106, 112 as a result. Therefore, if a business contract is subsequently downloaded in a region outside of clusters 102, 106, 112, that activity can be flagged. As previously mentioned, such geolocation clusters at the activity level can be made for other types of activity too, such as editing a document, sending an email, updating a portion of code, and so on.

For geolocation clusters at the member level, activities performed by one or more SaaS application member accounts associated with a single member of the entity can be associated with one or more geolocations. This can look like, for example, monitoring the activity of a member's account in Microsoft Outlook®, monitoring the activity of that same member's other account in Dropbox®, and monitoring the activity of that same member's other account in Adobe®. A density-based ML model can then analyze these various geolocations to learn trusted geolocation clusters for that member (i.e., at the member level). Thereafter, activities performed by that member associated with a geolocation outside the trusted geolocation clusters can be flagged for further analysis. Such sets of trusted geolocation clusters can be generated for each member of the entity.

Figure 1C:
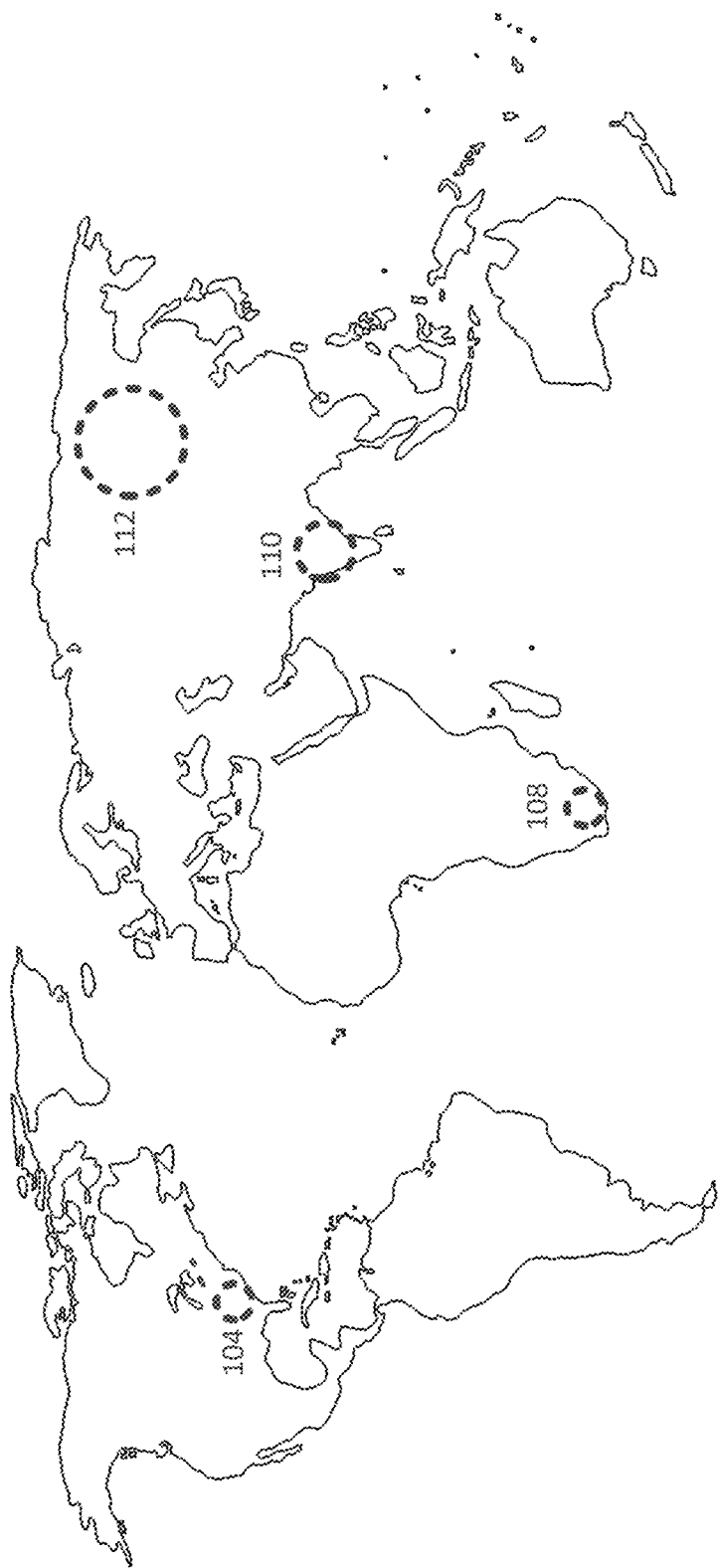
FIG. 1C shows an example of trusted geolocations at the member level for a particular member of the entity, according to an embodiment.

FIG. 1C is related to FIGS. 1A and 1B, but shows trusted geolocation clusters at the member level for one member. The member can be, for instance, an engineer of the engineering team located near cluster 104. That engineer may have multiple accounts to access engineering-related SaaS applications hosted by servers near clusters 108, 110 to perform various engineering-related tasks (e.g., write code, design a circuit). That engineer may also have an account to access a business-related SaaS application hosted by servers near cluster 112 to perform a business-related task (e.g., review engineering budgets). Therefore, the density-based ML model can recognize the density of account activity near such regions and generate clusters 104, 108, 110, 112 accordingly. For that engineer, any additional activity from any of these accounts occurring outside clusters 104, 108, 110, 112 can be flagged for further analysis.

In some implementations, rather than flagging an activity for being outside a trusted geolocation cluster, a trustworthiness value/score can be determined at the entity level, the activity level, and the member level. A model can analyze activities performed at the entity level, the activity level, and the member level independently to learn activity concentrations (i.e., activity density, activity magnitude) at various geolocations. In a visualized format, this can look like a heat distribution, where regions can have different activity concentrations compared to other regions. A trustworthiness score can be generated for an activity at the entity level, the activity level, and/or the member level (e.g., three separate scores, one cumulative score, one average score) based at least in part on the activity concentration, and the activity can be flagged if the trustworthiness score is outside a predetermined range. In some implementations, an activity is considered more trustworthy if it is associated with a geolocation having a higher activity concentration, and an activity is considered less trustworthy if it is associated with a geolocation having a lower activity concentration.

In some implementations, where activity concentrations are determined and geolocation clusters are generated, the clusters can be redefined (i.e., reshaped) so that the geolocation clusters only capture regions having an activity concentration within a predetermined range (e.g., above a predetermined threshold value, below a predetermined threshold value).

In some implementations, trusted geolocation clusters are not generated for regions and/or countries having an activity concentration below a predetermined threshold value. In some implementations, prior to a trusted geolocation cluster being generated having an activity concentration within that potential cluster can be estimated, and if the estimated activity concentration is below a predetermined threshold value, a trusted geolocation cluster is not generated at that region and/or country. In some implementations, prior to a trusted geolocation cluster being generated, all activities at an entity level, an activity level, and/or a member level that are determined to be performed at a country having an activity concentration less than a predetermined threshold value are not considered when generating trusted geolocation clusters and/or determining activity concentrations.

Regarding trusted ISPs, an associated ISP can be determined for each IP address at the entity level, activity level, and member level (e.g., via a look-up table). An outlier detection technique (e.g., doubleMAD) can be applied over the number of events seen for each ISP to analyze each ISP's event volume and determine outlier ISPs having a high event volume compared to other ISPs. Those ISPs that are outliers having a higher event volume are learned as trusted ISPs, while those ISPs that are not outliers having a high event volume are not learned as trusted ISPs. Thus, activities performed with IP addresses associated with ISPs that are not recognized as a trusted ISP set at the entity level, activity level, or member level can be flagged for further analysis. For example, if the IP addresses used by an entity are associated with a first ISP, a second ISP, and a third ISP, and the third ISP has an event volume $25x$ that of the first and second ISP, an outlier detection technique can be used to recognize that the third ISP has a relatively higher event volume compared to the first and second ISP and mark the third ISP as trusted.

For learning trusted ISPs at the entity level, all IP addresses used by all member accounts associated with the entity to access their various SaaS applications can be grouped according to ISP and analyzed by an outlier detection model. Those ISPs that are outliers having a relatively higher event volume can be assumed to be associated with a trusted ISP, while those ISPs that do not have a relatively higher event volume are not assumed to be associated with a trusted ISP and/or are assumed to be associated with an untrusted ISP. For IP addresses that are not associated with/recognized as a trusted ISP, the activities being performed using that IP address can be flagged for further analysis.

Learning trusted ISPs at the activity level are similar to learning trusted ISPs at the entity level, but rather than analyzing all ISPs/IP addresses used by member accounts associated with the entity to access various SaaS applications, ISPs/IP addresses used to perform a specific type of action (e.g., deleting a file) are analyzed. Once the IP addresses used to perform that specific type of action are grouped according to ISP, an outlier detection model can be used at each ISP to determine trusted ISPs. Those IP addresses associated with untrusted ISPs can be flagged for further analysis. Other types of activity can each have a set of trusted ISPs generated for their specific activity type. Thus, although an entity will only have one set of trusted ISPs at the entity level, it can be the case that the entity will have multiple sets of unique trusted ISPs at the activity level for different types of activities.

Learning trusted ISPs at the member level is similar to learning the trusted ISPs at the entity level and activity level, but rather than analyzing all ISPs/IP addresses used by member accounts of the entity or those member accounts used to perform a specific action, ISPs/IP addresses used by one or more member accounts associated with a single member of the entity are analyzed. The IP addresses are identified, one or more ISPs associated with the identified IP addresses are determined, and trusted ISPs are learned using an outlier detection model. Each member of the entity can have their own set of trusted ISPs at the member level.

Once the trusted geolocation clusters and trusted ISPs have been generated (i.e., learned) at the entity levels, activity levels, and member levels, activities performed within a SaaS application by a member account associated with the entity that do not fall within a trusted geolocation cluster and/or are not associated with (i.e., not recognized as being) a trusted ISP are flagged. For example, if an activity occurred at a location outside a trusted geolocation cluster at the entity level, that activity is flagged. As another example, if an activity occurred with an IP address that is not recognized as being a trusted ISP for that specific activity, it can be flagged. As another example, if an activity occurred at a geolocation such that a trustworthiness score of the activity at the entity level is outside a predetermined range, that activity is flagged.

For those activities that have been flagged, transitions to/from that flagged activity (by the same member) can be analyzed to determine if it satisfies the speed threshold. For example, if the span of time and distance from a flagged activity to a subsequent activity by a member account associated with that same member would require that user to travel at a speed greater than humanly possible, the speed threshold can be satisfied. It can be appreciated that the speed threshold can vary depending on the available modes of transportation between the location associated with the flagged activity and the location associated with the activity before and/or after the flagged activity. For instance, if a transition including a flagged activity occurred between two locations that are each nearby airports, and airplane travel is the fastest mode of transportation between the two locations, the speed threshold can be similar to the speed of the airplane. As another example, if travelling by train is the fastest mode of transportation between the two locations, the speed threshold can be similar to the speed of the train. In some implementations, the speed threshold can be the fastest mode of available human transportation in existence at the time.

For those activities that have been flagged and satisfy the speed threshold, secondary filtration can be applied, either manually, analytically, with an ML algorithm, or a combination thereof. For those activities that have been flagged, satisfy the speed threshold, and passed through the secondary filters, an alert can be generated indicating that a security threat may be present.

In some implementations, additional steps can automatically be taken in response to the alert. In some implementations, the member account associated with that alert can automatically be logged out. Thereafter, that member account can remain logged out for a specific amount of time, for an indefinite amount of time, or until any other predefined criteria has been fulfilled. In some implementations, the member associated with the potentially compromised member account may be required to provide additional authentication information, such as re-entering a password, answering a security question, or performing a biometric measurement. In some implementations, a notification/alert is sent to a separate compute device, such as another compute device associated with the member, another compute device associated with that member's supervisor, another compute device associated with an information technology (IT) specialist, and/or another compute device associated with a third-party monitoring entity. In some implementations, the member account loses permission/access to perform certain actions, such as accessing other SaaS applications associated with the member of the suspicious member account. In some implementations, prior and future activities associated with that member can be logged. In some implementations, a security system is updated, such as changing firewall settings and/or updating a blacklist.

Although the discussions above included generating trusted geolocation clusters and identifying trusted ISPs at the entity, activity, and member level, it can be appreciated that other methods of filtering data associated with member account activities can be used in addition to and/or in place of filtering at the entity, activity, and/or member level. Any type of one more or more filtering categories can be used, such as all the geolocations and ISPs/IP addresses associated with members having a specific job title, members having a certain number of years of experiences, members assigned to a specific project, members with citizenships to a certain country, members put on a watch list, peer groups learned based on activity patterns, contractors, employees, and so on.

Figure 2A:
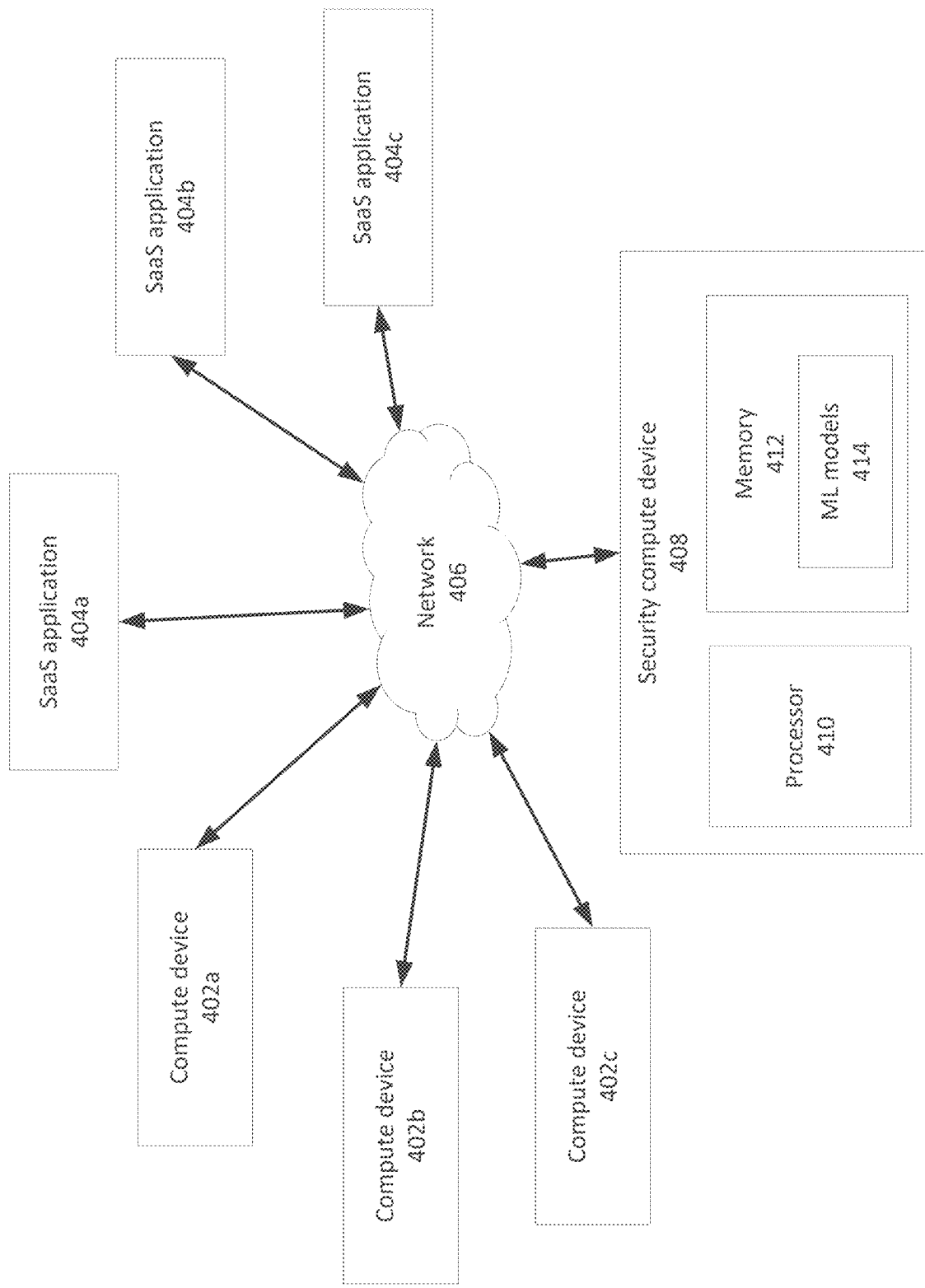
FIG. 2A shows a block diagram including a security compute device that detects impossible travel events across a multiple cloud-based application environment, according to an embodiment.

FIG. 2A shows a block diagram including compute devices 402a, 402b, 402c, SaaS applications 404a, 404b, 404c, and a security compute device 408 all interconnected via a network 406. The network 406 can be, for example, a wireless network(s) or a combination of a wireless network(s) and wired networks. The compute devices 402a, 402b, 402c (e.g., computer, phone) can be used to login into member accounts to access the SaaS applications 404a, 404b, 404c and perform various activities. For example, at a college, a professor may use their compute device to log into their account for accessing a teaching-related SaaS application, a student may use their compute device to log into their account for accessing a student-related SaaS application, and an administrator may use their compute device to log into their account for accessing an administration-related SaaS application. It may sometimes be the case, however, that at least one of the compute devices 402a, 402b, 402c is associated with someone (e.g., a malicious individual/entity) posing as a member of the entity.

As activities are performed using the SaaS applications 404a, 404b, 404c, the security compute device 408 can collect a representation of these activities (and associated attributes) and determine the member account/(supposed) member that performed each activity. For example, the processor 410 can recognize that a professor logged into their school Microsoft Outlook® email account at a specific time to perform a set of activities, that the professor subsequently logged into their personal Google® Gmail email account at a different time to perform another set of activities, and that the professor subsequently logged into their Adobe® Create SaaS account at yet another different time to perform another set of activities.

The security compute device 408 can include a memory 412, operatively coupled to the processor 410, storing ML models 414. The ML models 414 can be trained to analyze the activities across the SaaS applications 404a, 404b, 404c, and learn (1) trusted geolocation clusters at the user, event, and entity level, and (2) trusted ISP at the user, event, and entity level. Thereafter, any activity associated with a geolocation outside any of the trusted geolocation clusters at the user, event, or entity level can be flagged, as well as any activity associated with an IP address outside a set of one or more trusted ISPs at the user, event, and entity level. In some implementations, the ML models 414 can be trained to learn activity concentrations associated with various geolocations at the member level, the activity level, and the entity level. Thereafter, the ML models 414 can output a trustworthiness score(s) for an activity based on a geolocation associated with that activity and the learned activity concentrations, and flag that activity if the trustworthiness score(s) is outside a predetermined range(s). In some implementations, if trusted geolocation clusters were already generated, they can be redefined based on the learned activity concentrations (e.g., remove portions of a cluster having a low activity concentration). The flagged activities can be analyzed to verify that the flagged activity occurred over a period of time and distance relative to at least one of (1) a previous activity performed right before the flagged activity, or (2) a subsequent activity performed right after the flagged activity that is above a speed threshold (e.g., a speed impossible for a human to accomplish).

For those flagged activities that occurred in a transition to/from that flagged activity with a speed beyond the speed threshold, after performing any secondary filtration steps, an alert can be generated. For example, the security compute device 408 can send a signal to one of the SaaS applications 404a, 404b, 404c to log out the user account that performed the flagged activity. For another example, the security compute device 408 cam send a signal to one of the user compute devices 402a, 402b, 402c to force the user of that compute device to perform additional authentication steps.

Figure 2B:
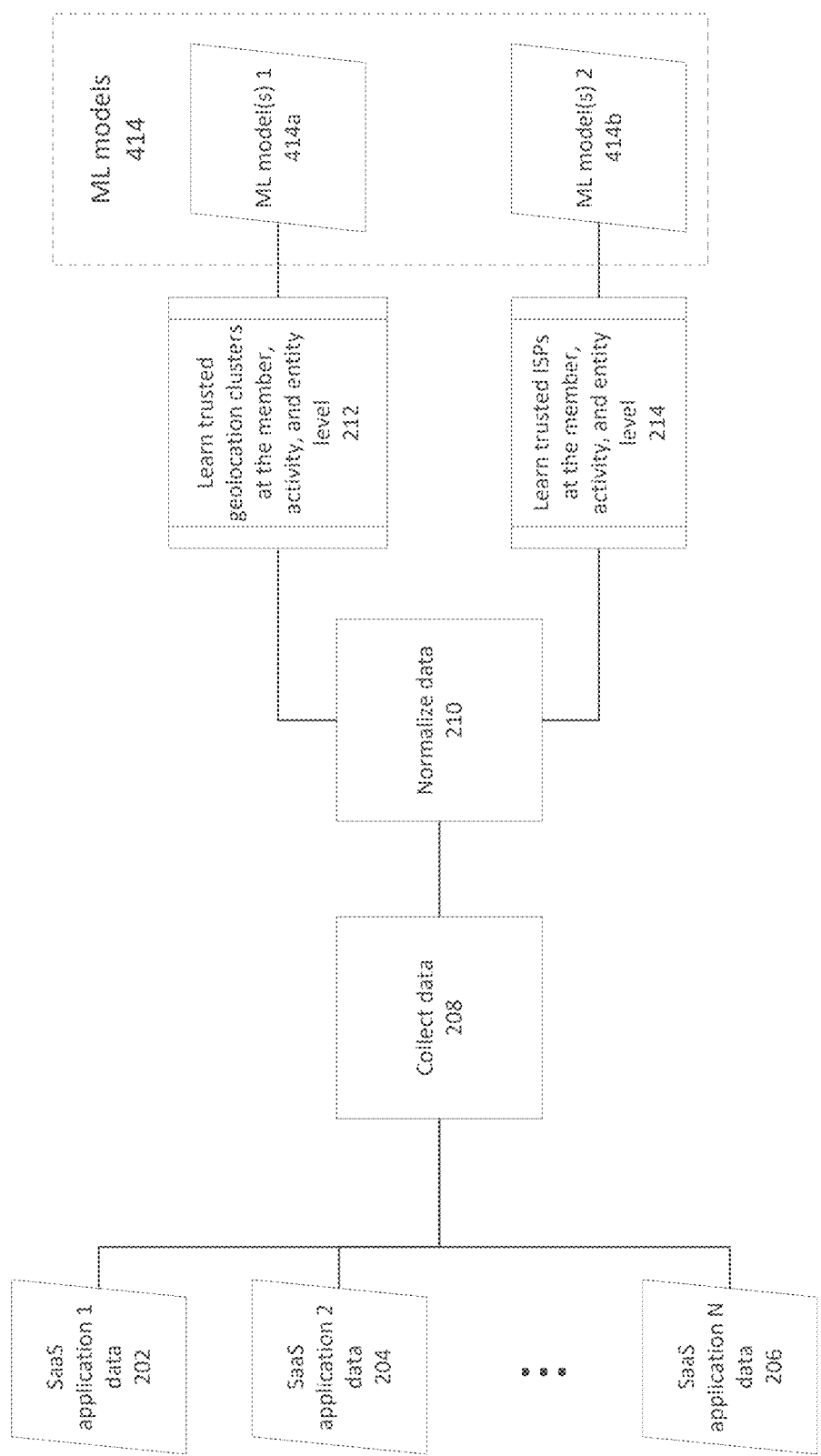
FIG. 2B shows a method for generating machine learning (ML) models, according to an embodiment.

FIG. 2B shows a method for generating the ML models 414, according to an embodiment. As members/member accounts associated with an entity perform various activities using SaaS applications, SaaS application 1 data 202, SaaS application 2 data 204, . . . , and SaaS application N data 206, can be collected in 208, where N can be the total number of different SaaS applications used by an entity, and the data include representations of these activities (and associated attributes). At 210, SaaS application 1 data 202, SaaS application 2 data 204, . . . , and SaaS application N data 206 are normalized so that activities performed by all member accounts are each associated with their (alleged) member. Additional details related to 208 and 210 can be found in U.S. Pat. No. 10,931,699 (reference previously). For instance, if a member performed a first set of activities in SaaS application 1, a second set of activities in SaaS application 2, and a third set of activities in SaaS application N, that member becomes associated with the first, second, and third set of activities. Such a process is performed for each member of the entity at 210. At 212, the normalized data across all N SaaS applications are analyzed by ML model(s) 1 414a to generate (i.e., learn) trusted geolocation clusters at the member level (i.e., for each member of the entity), at the activity level (i.e., for each type of activity), and at the entity level. In some implementations, the ML model(s) 1 414a can include a plurality of models, where a first model included in the ML model(s) 1 414a is trained to learn trusted geolocation clusters at the member level, a second model included in the ML model(s) 1 414a is trained to learn trusted geolocation clusters at the activity level for an activity, and a third model included in the ML model(s) 1 414a is trained to learn trusted geolocation clusters at the activity level for a member. Additional details related to 212 are discussed with respect to FIG. 4A. At 214, the normalized data across all N SaaS applications are analyzed by ML model(s) 2 414b to generate (i.e., learn) trusted ISPs at the member level, at the activity level, and at the entity level. In some implementations, the ML model(s) 2 414b can include a plurality of models, where a first model included in the ML model(s) 2 414b is trained to learn trusted geolocation clusters at the member level, a second model included in the ML model(s) 2 414b is trained to learn trusted geolocation clusters at the activity level for an activity, and a third model included in the ML model(s) 2 414b is trained to learn trusted geolocation clusters at the activity level for a member. Additional details related to 214 are discussed with respect to FIG. 4B.

Figure 3:
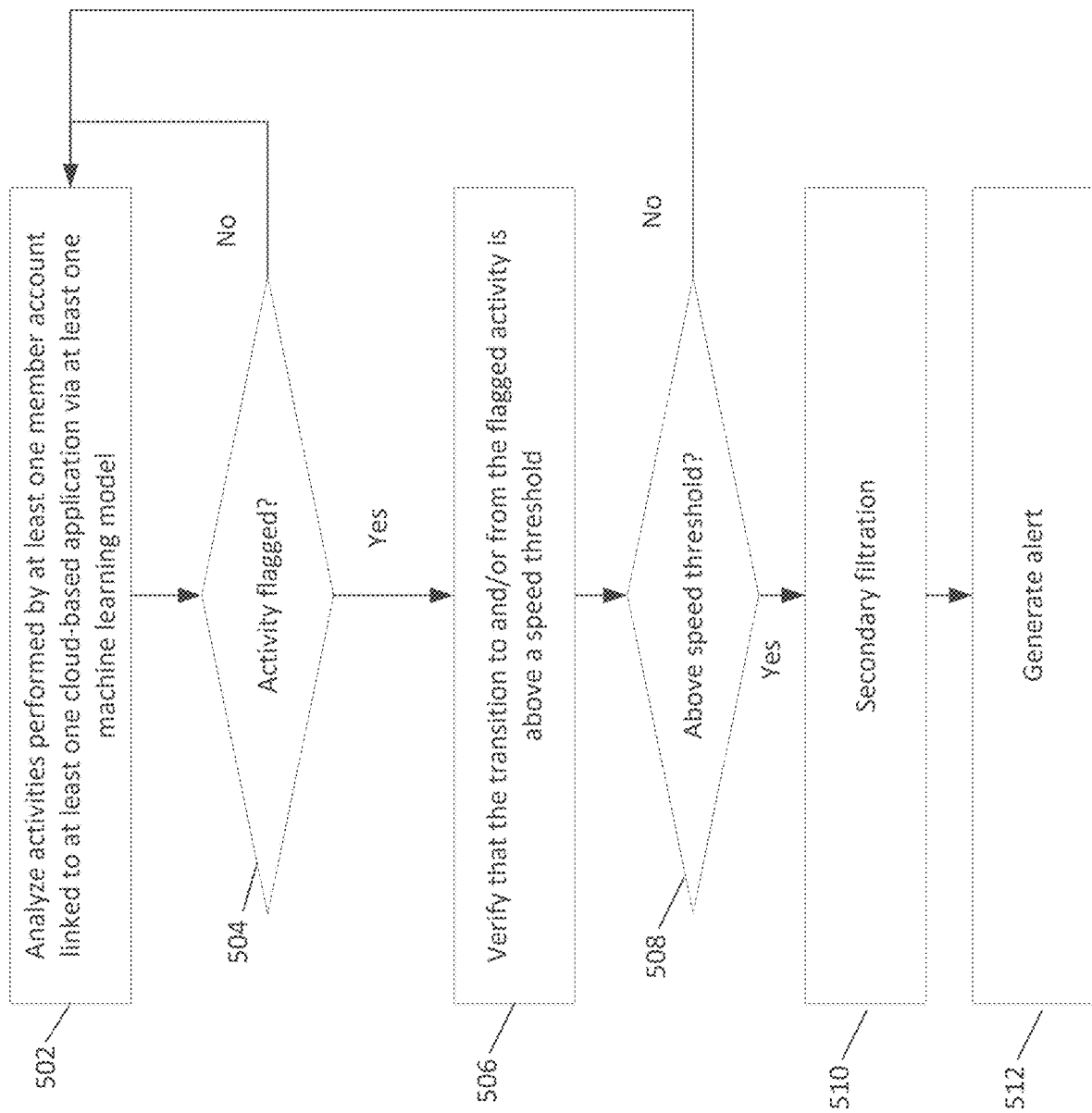
FIG. 3 shows a flowchart of a method for identifying potential impossible travel events, according to an embodiment.

FIG. 3 shows a flowchart for a method, according to one embodiment. The method of FIG. 3 relates to an entity having access to multiple independent cloud-based applications (e.g., applications running on the cloud, applications that use the cloud at least partially, software that users or compute devices access primarily through the internet, software managed by a server and not a user's local machine, and/or the like) and including a member having access to at least one cloud-based application from the multiple independent cloud-based applications via at least one member account associated with to the at least one cloud-based application. At 502, an analysis is performed on multiple activities performed using the at least one member account, with at least one machine learning model configured to flag a first activity having a first activity type from the multiple activities in response to at least one of (1) the first activity being associated with a geolocation outside at least one of (a) a trusted geolocation cluster at an entity level for the entity, (b) a trusted geolocation cluster at an activity level for the first activity type, or (c) a trusted geolocation cluster at a member level for the member, (2) the first activity having a geolocation trustworthiness score outside at least one of (a) a first predetermined range at the entity level for the entity level, (b) a second predetermined range at the activity level for the first activity type, or (c) a third predetermined range at the member level for the member (where the first, second, and third predetermined ranges can be the same, different, or a mix of both), or (3) the first activity being associated with an ISP not recognized as being at least one of (a) a trusted ISP at the entity level for the entity, (b) a trusted ISP at the activity level for the first activity type, or (c) a trusted ISP at the member level for the member.

At 504, a determination is made as to whether the activity was flagged by the at least one machine learning model. If the activity was not flagged, return to 502. If the activity was flagged, proceed to 506. At 506, a verification is made that the first activity occurred over a period of time and distance relative to at least one of (1) a second activity from the multiple activities performed before the first activity, or (2) a third activity from the multiple activities performed after the first activity that is above a speed threshold. If the transition to/from the flagged activity is not above the speed threshold, return to 502. If the transition to/from the flagged activity is above the speed threshold, proceed to 510.

At 510, secondary filtrations steps are performed to filter out flagged activities that are likely not impossible travel events. A myriad of actions can be performed at 510 depending on the given context (e.g., customer preferences, security compute device software updates by a developer). As an example, a flagged activity can be filtered out if the flagged activity transitions to or from a specific activity. As another example, a flagged activity can be filtered out if it is associated with a predetermined attribute (e.g., member, IP address, ISP, country, triggered recently).

At 512, an alert for the remaining flagged activities are generated. Any type of alert that can mitigate the threat posed by a compromised member account can be employed. In some implementations, this can look like sending signals to cloud-based applications associated with member accounts associated with the remaining flagged activities to cause those members accounts to be logged out. In some implementations, this can look like sending a signal to compute devices performing the flagged activities to cause the users associated with the compute devices to perform additional verification steps. In some implementations, this can look like sending a signal to another compute device to notify a user associated with that compute device of the potentially compromised member account. In some implementations, the member account can lose permission/access to perform certain actions and/or access certain files/applications. In some implementations, this can look like updating a security system associated with the entity, like adding the IP address associated with the compromised member account to a blacklist.

Figure 4A:
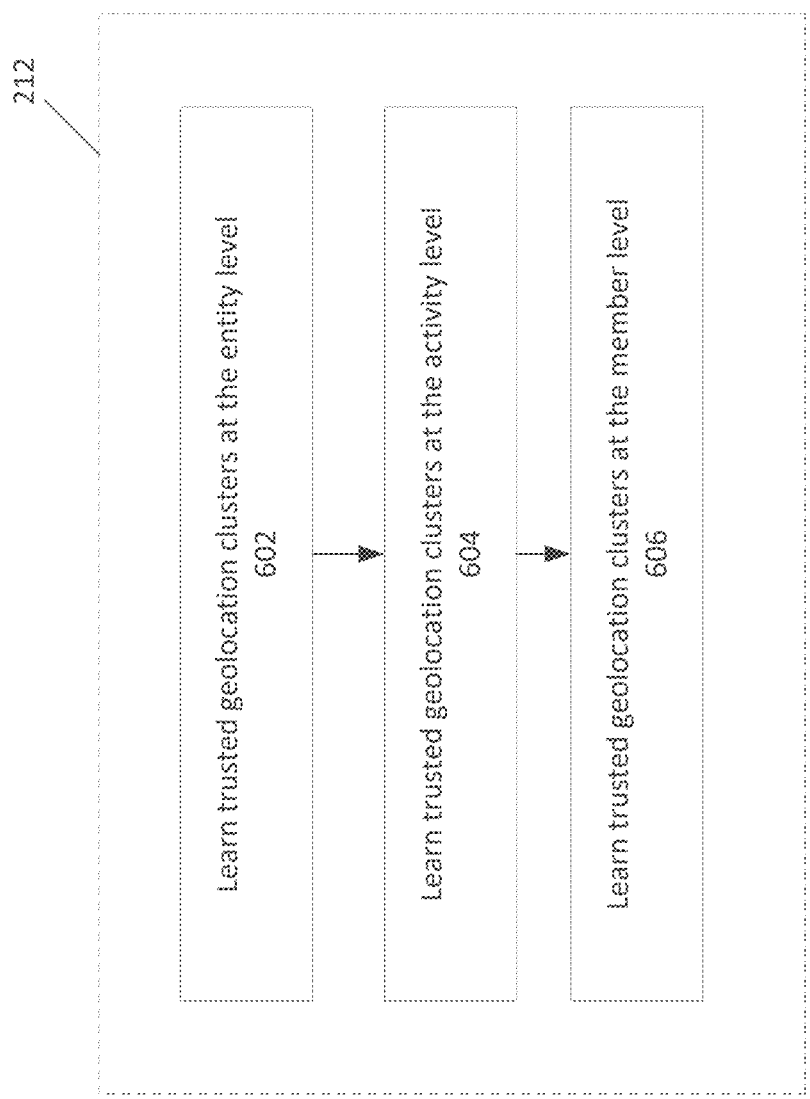
FIG. 4A shows a flowchart of a method for identifying trusted geolocation clusters, according to an embodiment.

FIG. 4A shows a flowchart for 212, according to one embodiment. At 602, trusted geolocation clusters at the entity level are generated. In some implementations, his can look like identifying one or more geolocations associated with (e.g., linked to) each activity performed by each member account associated with each SaaS-based application used by an entity, and applying a density-based ML model to identify clusters of geolocations at the entity level. Additionally or alternatively, in some implementations, the density-based ML model and/or a different model can further determine an activity concentration/magnitude within each of the identified clusters, similar to a heat map, and adjust clusters at the entity level to remove sub-regions of clusters that have an activity magnitude value below a predetermined threshold value. At 604, trusted geolocation clusters at the activity level are generated. This can look like, for each activity, identifying one or more geolocations associated with (e.g., linked to) a specific activity performed by member accounts, and applying a density-based ML model to identify clusters of geolocations for that activity. Additionally or alternatively, in some implementations, the density-based ML model and/or a different model can further determine an activity concentration/magnitude within each of the identified clusters, similar to a heat map, and adjust clusters at the activity level to remove sub-regions of clusters that have an activity magnitude value below a predetermined threshold value. At 606, trusted geolocation clusters at the member level are generated. This can look like, for each member of the entity, identifying one or more geolocations associated with activities performed by all member accounts linked to a specific member, and applying a density-based ML model to identify clusters of geolocations for that specific member. Additionally or alternatively, in some implementations, the density-based ML model and/or a different model can further determine an activity concentration/magnitude within each of the identified clusters, similar to a heat map, and adjust clusters at the member level to remove sub-regions of clusters that have an activity magnitude value below a predetermined threshold value. In some implementations, 602 produces a first model included in ML model(s) 1 414a, 604 produces a second model included in ML model(s) 1 414a and independent from the first model, and 606 produces a third model included in ML model(s) 1 414a and independent from the first and second model. In some implementations, 602, 604, and 606 produce a single model.

FIG. 4B shows a flowchart for 214, according to one embodiment. At 608, trusted ISPs at the entity level are learned. This can look like identifying all IP addresses associated with (e.g., linked to) each activity performed by each member account associated with each SaaS-based application used by an entity, identifying one or more ISPs associated with those identified IP addresses, and applying an outlier detection model over the event volume seen for each ISP from the one or more ISPs to identify trusted and untrusted ISPs at the entity level, where trusted ISPs are outliers having a high event volume and untrusted ISPs are not outliers having a high event volume. At 610, trusted ISPs at the activity level are learned. This can look like, for each activity, identifying IP addresses associated with (e.g., linked to) a specific activity performed by member accounts, identifying one or more ISPs associated with those identified IP addresses, and applying an outlier detection model over the event volume seen for each ISP from the one or more ISPs to identify trusted and untrusted ISPs for that activity, where trusted ISPs are outliers having a high event volume and untrusted ISPs are not outliers having a high event volume. At 612, trusted ISPs at the member level are learned. This can look like, for each member of the entity, identifying IP addresses associated with (e.g., linked to) activities performed by all member accounts associated with (e.g., linked to) a specific member, identifying one or more ISPs associated with those identified IP addresses, and applying an outlier detection model over the event volume seen for each ISP from the one or more ISPs to identify trusted and untrusted ISPs for that specific member, where trusted ISPs are outliers having a high event volume and untrusted ISPs are not outliers having event volume. In some implementations, 608 produces a first model included in ML model(s) 2 414b, 610 produces a second model included in ML model(s) 2 414b and independent from the first model, and 612 produces a third model included in ML model(s) 2 414b and independent from the first and second model. In some implementations, 608, 610, and 612 produce a single model.

Of course, in other implementations, 602-606 in 212 and/or 608-612 in 214 can be performed in a different sequence and/or in parallel to one another. Upon completion of 212 and 214, the various trusted clusters can be used to flag future activities of member accounts for further analysis to determine if an impossible travel event has occurred.

Although in the discussions above, trusted geolocation clusters at the member level and trusted ISP at the member level were generated/earned for each member of the entity, is some implementations, trusted geolocation clusters at the member level and trusted ISP clusters at the member level can be generated for a portion of members of the entity, such as C-suite executives or international students.

Although in the discussions above, the speed threshold was described as a speed that would be impossible for a human to achieve, in some implementations, the speed threshold can be tweaked such that the speed threshold can be possible for a human to achieve, but highly unlikely (e.g., the member would have to fly in a jet to perform such a transition). Examples of speed thresholds include greater than 500 miles per hour, greater than 600 miles per hours, or faster than 2000 miles per hours.

Although the discussions above were related to determining whether or not an IP address is associated with a trusted ISP, in some implementations, an ISP and/or IP address can be associated with a trustworthiness score (e.g., where a higher score indicates the ISP and/or IP address is more trustworthy and a lower score indicates the ISP and/or IP address is less trustworthy). The trustworthiness score for an ISP and/or IP address can be determined using a variety of techniques, alone or in combination.

For example, in some implementations, dispersion (e.g., entropy), volume, regularity, and/or frequency of an IP address and/or contiguous IP addresses for activities at the entity level, activity level, and/or member level can be used to determine IP density clusters. Density-based (e.g., DBSCAN) and/or graph-based (e.g., nearest neighbor graph, k-nearest neighbor graph) methods can be used to estimate trust within the IP density clusters. For example, an activity associated with an IP address that is within a denser portion of an IP density cluster can be assumed to be more trustworthy (e.g., assigned a higher trustworthiness score), while an activity associated with an IP address that is within a less dense portion of an IP density cluster and/or not within an IP density cluster at all can be assumed to be less trustworthy (e.g., assigned a lower trustworthiness score).

As another example, in some implementations, all IP addresses used by an entity, for an activity, or by a member of the entity to access one or more SaaS applications can be grouped according to ISP. Those ISPs having a relatively higher event volume can be assumed to be more trustworthy (e.g., assigned a higher ISP trustworthiness score), while those ISPs having a relatively lower event volume can be assumed to be less trustworthy (e.g., assigned a lower ISP trustworthiness score). Additionally or alternatively, dispersion, volume, regularity, and/or frequency of an IP address and/or contiguous IP addresses for activities at the entity level, activity level, and/or member level can be used to determine IP density clusters for a particular ISP to identify trusted IP space for that ISP; in some implementations, such techniques can be used to identify virtual private cloud (VPC) address spaces associated with a cloud computing platform (e.g., Microsoft Azure®, Amazon Web Services®, Google Cloud®, IBM Cloud®, CloudLinux®, etc.). In some implementations, an IP address more likely to be associated with a VPC can be considered more trustworthy compared to an IP address that is less likely to be associated with a VPC. In some implementations, an activity associated with an IP address that is within a denser portion of an IP density cluster for an ISP can be assumed to be more trustworthy (e.g., assigned a higher trustworthiness score), while an activity associated with an IP address that is within a less dense portion of an IP density cluster and/or not within an IP density cluster at all for that ISP can be assumed to be less trustworthy (e.g., assigned a lower trustworthiness score).

In some implementations, three individual ISP trustworthiness score can be generated for an activity (e.g., a first ISP trustworthiness score at the entity level, a second ISP trustworthiness score at the activity level, and a third ISP trustworthiness score at the member level). In some implementations, a single ISP trustworthiness score can be generated for an activity (e.g., a single composite score that is a function of a first ISP trustworthiness score at the entity level, a second ISP trustworthiness score at the activity level, and a third ISP trustworthiness score at the member level; a single score that is the maximum value chosen from of a first ISP trustworthiness score at the entity level, a second ISP trustworthiness score at the activity level, and a third ISP trustworthiness score at the member level; a single score that is the minimum value chosen from of a first ISP trustworthiness score at the entity level, a second ISP trustworthiness score at the activity level, and a third ISP trustworthiness score at the member level, etc.). In some implementations, an IP address used for performing an activity that is associated with an ISP trustworthiness score outside a predetermined range (e.g., below a trustworthiness score threshold) can cause at least one remedial action to be performed. Examples of remedial actions include restricting member account access (e.g., restricting privileges), causing an alert to be sent (e.g., to a compute device associated with a cybersecurity analyst), logging a compute device off, logging data (e.g., before and/or after the activity), enabling additional security measures, requesting authentication from a user (e.g., a password, biometric, and/or the like), and/or the like.

Figure 5:
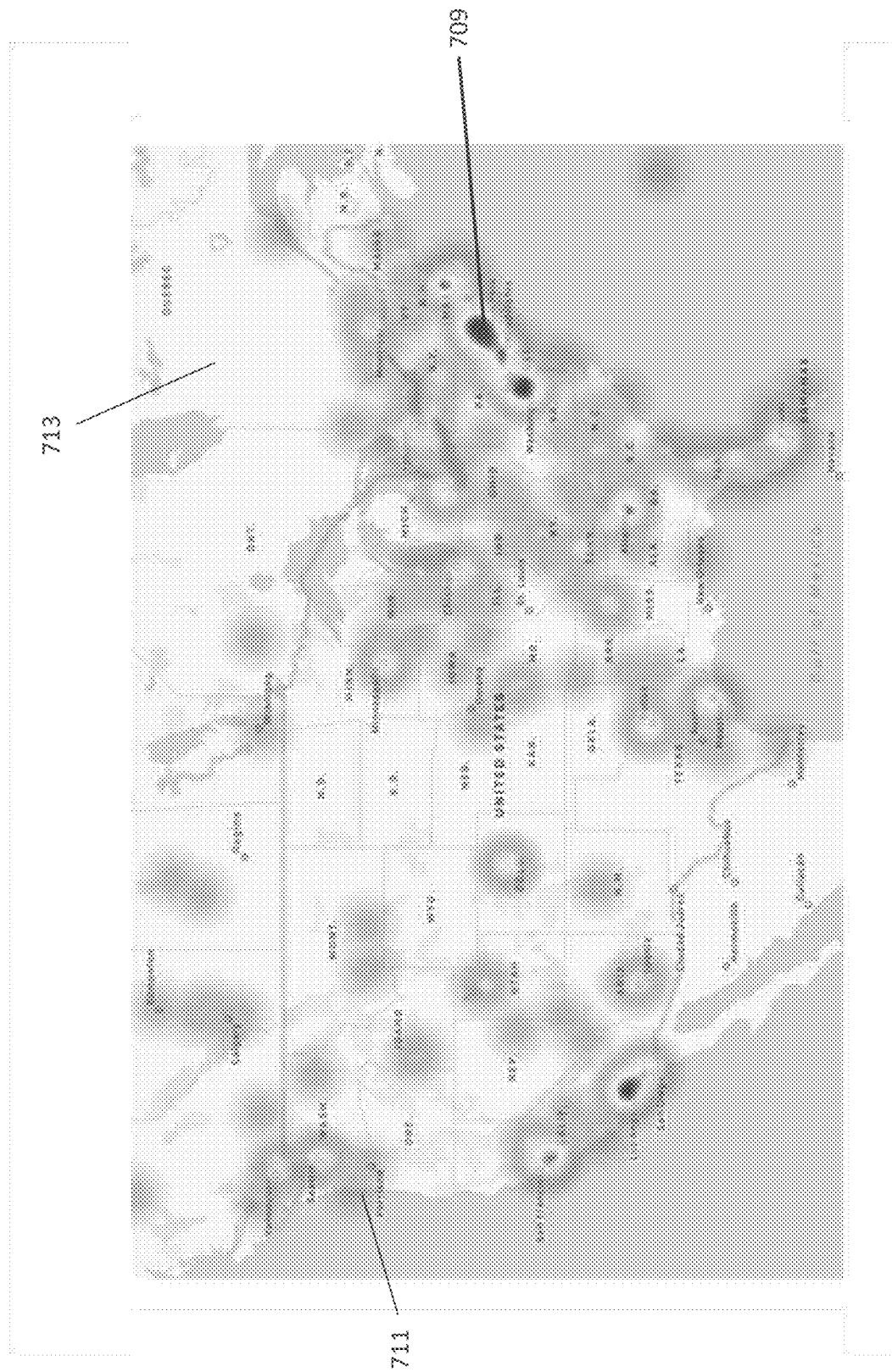
FIG. 5 shows an example of activity concentrations, according to an embodiment.

FIG. 5 shows an example of a map outlining geospatial activity concentrations (e.g., at one of the entity level, the activity level, or the member level) that can be used for generating a geolocation trustworthiness score at one of the entity level, the activity level, or the member level, according to an embodiment. In FIG. 5, locations with darker overlays (e.g., geolocation 709) indicate higher geospatial activity concentrations, locations with lighter overlays (e.g., geolocation 711) indicate lower geospatial activity concentrations, and locations with no overlay (e.g., geolocation 713) indicate no measurable activity concentration. If, for example, an activity is determined to be performed at geolocation 709, that activity may be deemed more trustworthy (e.g., assigned a higher geolocation trustworthiness score) than if the activity had been determined to be performed at geolocation 711.

FIG. 6 shows a flowchart of a method for generating at least one trustworthiness score, according to an embodiment. In some implementations, the at least one trustworthiness score can be a single score based on (e.g., a function of, a maximum from, a minimum from) at least one geolocation trustworthiness score based on activity concentrations and at least one ISP trustworthiness score based on IP address concentrations. In some implementations, the at least one geolocation trustworthiness score can also be a score based on (e.g., a function of, a maximum from, a minimum from) individual geolocation trustworthiness scores at the entity level, the activity level, and the member level. In some implementations, the at least one ISP trustworthiness score can also be a score based on (e.g., a function of, a maximum from, a minimum from) individual ISP trustworthiness scores at the entity level, the activity level, and the member level.

At 701, activity geolocation concentrations and IP address concentrations are determined at the entity level. Regarding determining activity geolocation concentrations at the entity level, for a set of activities performed by the entity, a model (e.g., ML models 414) can determine geolocations associated with each activity from the set of activities and generate a representation of activity concentrations at the determined geolocations. Regarding determining IP address concentrations at the entity level, for a set of IP addresses used by the entity to perform activities, a model (e.g., ML models 414) can determine an ISP associated with each IP address from the set of IP addresses and generate a representation of IP address concentrations for each ISP (e.g., a first ISP is associated with 60% of all IP addresses associated with the entity, a second ISP is associated with 30% of all IP addresses associated with the entity, and a third ISP is associated with 10% of all IP addresses associated with the entity). At 703, activity geolocation concentrations and IP address concentrations are determined at the activity level. Regarding determining activity geolocation concentrations at the activity level, for activities of an activity type, a model (e.g., ML models 414) can determine geolocations associated with each activity and generate a representation of activity concentrations at the determined geolocations. Regarding determining IP address concentrations at the activity level, for a set of IP addresses used by members of the entity for performing activities of an activity type, a model (e.g., ML models 414) can determine an ISP associated with each IP address from the set of IP addresses and generate a representation of IP address concentrations for each ISP. At 705, activity geolocation concentrations and IP address concentrations are determined at the member level. Regarding determining activity geolocation concentrations at the member level, for activities of a member of the entity, a model (e.g., ML models 414) can determine geolocations associated with each activity and generate a representation of activity concentration at the determined geolocations. Regarding determining IP address concentrations at the member level, for a set of IP addresses used by a member of the entity to perform activities, a model (e.g., ML models 414) can determine an ISP associated with each IP address from the set of IP addresses and generate a representation of IP address concentrations for each ISP At 707, at least one trustworthiness score is generated (e.g., for an activity). In some implementations, the at least one trustworthiness score is a function of (1) at least one geolocation trustworthiness score based on activity concentrations (e.g., where the at least one geolocation trustworthiness score can be a function of a geolocation trustworthiness score at the entity level for the activity, a geolocation trustworthiness score at the activity level for the activity, and a geolocation trustworthiness score at the member level for the activity), and (2) at least one ISP trustworthiness score based on IP address concentrations (e.g., where the at least one ISP trustworthiness score can be a function of an ISP trustworthiness score at the entity level for the activity, an ISP trustworthiness score at the activity level for the activity, and an ISP trustworthiness score at the member level for the activity). In some implementations, the at least one trustworthiness score is a number value (e.g., between 0 (least trustworthy) and 100 (most trustworthy)). In some implementations, if an activity occurred at a location having a higher concentration of activities at the entity, activity, and member level, the activity is considered more trustworthy (e.g., higher trustworthiness score). In some implementations, if an activity occurred at a location having a lower concentration of activities at the entity, activity, and member level, the activity is considered less trustworthy (e.g., lower trustworthiness score). In some implementations, if an IP address is associated with (e.g., was performed using) an ISP having a relatively higher ISP trustworthiness score, the IP address can be assumed to be more trustworthy. In some implementations, if an IP address is associated with (e.g., was performed using) an ISP having a relatively lower ISP trustworthiness score, the IP address can be assumed to be less trustworthy.

In some implementations, the method discussed with respect to FIG. 6 can further include flagging an activity if the at least one trustworthiness score is outside a predetermined range. For example, where a trustworthiness score can have a value between 0 (least trustworthy) and 100 (most trustworthy), an activity can be flagged if the at least one trustworthiness score is below 75. In some implementations, activities can be flagged to indicate different magnitudes of urgency. For example, where a trustworthiness score can have a value between 0 (least trustworthy) and 100 (most trustworthy), an activity can be flagged as suspicious if the at least one trustworthiness score is below 80, and the activity can be flagged as highly suspicious if the at least one trustworthiness score is below 60.

In some implementations, the trustworthiness score and/or how an activity is flagged can be used to determine what and/or when one or more remedial actions are performed. In some implementations, a first trustworthiness score range and/or how an activity is flagged causes a first remedial action, while a second trustworthiness score range and/or how the activity is flagged causes a second remedial action different than the first remedial action. For example, very low trustworthiness scores and/or an activity flagged as highly suspicious can cause one or more remedial actions that immediately end at least one user session, while trustworthiness scores that are not at low and/or an activity flagged as mildly suspicious can cause a second remedial action to be performed, such as causing a warning signal to be sent (e.g., to compute device 402*a*, 402*b*, and/or 402*c*).

FIG. 7 shows a flowchart of a method 800 to generate a trustworthiness score for an activity based on a geolocation associated with the activity and an IP address associated with the activity, according to an embodiment. In some implementations, method 800 is performed by a processor (e.g., processor 410).

At 801, (1) activity geolocation concentrations at an entity level and (2) IP address concentrations at the entity level are determined for an entity having access to a plurality of independent cloud-based applications (e.g., SaaS applications 404*a*, 404*b*, and 404*c*). At 803, for each activity type from a plurality of activity types performed at the plurality of independent cloud-based applications and associated with the entity, (1) activity geolocation concentrations at an activity level for that activity type and (2) IP address concentrations at the activity level for that activity type are determined. At 805, for each member from a plurality of members associated with the entity, (1) activity geolocation concentrations at a member level for that member and (2) IP address concentrations at the member level for that member are determined. 801, 803, and 805 can be performed in any sequence and/or in parallel. For example, 801 can be performed first followed by 803 and 805 in parallel. As another example, 801, 803, and 805 can all occur in parallel.

At 807, at least one trustworthiness score is generated for an activity, having an activity type and associated with a member from the plurality of members, based on: (1) a geolocation associated with the activity; (2) at least one of the activity geolocation concentrations at the entity level, the activity geolocation concentrations at the activity level for the activity type, or the activity geolocation concentrations at the member level for the member; (3) an IP address associated with the activity; (4) an ISP associated with the IP address; and (5) at least one of the IP address concentrations at the entity level, the IP address concentrations at the activity level for the activity type, or the IP address concentrations at the member level for the member. In some implementations, 807 occurs automatically (e.g., without human intervention) in response to completing 801, 803, and 805.

At 809, in response to the at least one trustworthiness score being outside a predetermined range, an instruction is sent to cause a remedial action in at least one of a network (e.g., network 406) associated with the entity, an application from the plurality of independent cloud-based applications, or a compute device of a member associated with the entity (e.g. compute device 402*a*, 402*b*, and/or 402*c*). In some implementations, 809 occurs automatically (e.g., without human intervention) in response to completing 807.

Some implementations of method 800 further include identifying, to generate a list of geolocations and for each activity (1) performed at the plurality of independent cloud-based application and (2) associated with the entity, a geolocation associated with that activity. The activity geolocation concentrations at the entity level can be generated, for example, using an unsupervised density-based machine learning model (e.g., ML models 414) and based on the list of geolocations.

Some implementations of method 800 further include, for each activity type from the plurality of activity types, identifying, to generate a list of geolocations and for each activity (1) performed at the plurality of independent cloud-based applications, (2) associated with the entity, and (3)

being that activity type, a geolocation associated with that activity. The activity geolocation concentrations at the activity level for that activity type can then be generated using, for example, an unsupervised density-based machine learning model (e.g., ML models 414) and based on the list of geolocations.

Some implementations of method 800 further include, for each member from the plurality of members, identifying, to generate a list of geolocations and for each activity (1) performed at the plurality of independent cloud-based applications, (2) associated with the entity, and (3) performed via an account associated with that member, a geolocation associated with that activity. The activity geolocation concentrations at the member level for that member can then be generated using, for example, an unsupervised density-based machine learning model (e.g., ML models 414) and based on the list of geolocations.

Some implementations of method 800 further include identifying, to generate a list of IP addresses and for each activity (1) performed at the plurality of independent cloud-based application and (2) associated with the entity, an IP address associated with that activity. The list of IP addresses are then analyzed to generate the IP address concentrations at the entity level.

Some implementations of method 800 further include, for each activity type from the plurality of activity types, identifying, to generate a list of IP addresses and for each activity (1) performed at the plurality of independent cloud-based application, (2) associated with the entity, and (3) being that activity type, an IP address associated with that activity. The list of IP addresses are then analyzed to generate the IP address concentrations at the activity level for that activity type.

Some implementations of method 800 further include, for each member from the plurality of members, identifying, to generate a list of IP addresses and for each activity (1) performed at the plurality of independent cloud-based application, (2) associated with the entity, and (3) performed via an account associated with that member, an IP address associated with that activity. The list of IP addresses are then analyzed to generate the IP address concentrations at the member level for that member.

Some implementations of method 800 further include determining preliminary activity geolocation concentrations at the entity level. A portion of the preliminary activity geolocation concentration having an activity concentration less than a predetermined threshold value are then removed to generate the activity geolocation concentrations.

Some implementations of method 800 further include, for each activity type from the plurality of activity types, determining preliminary activity geolocation concentrations at the activity level for that activity type. A portion of the preliminary activity geolocation concentrations having an activity concentration less than a predetermined threshold value is then removed to generate the activity geolocation concentrations at the activity level for that activity type.

Some implementations of method 800 further include, for each member from the plurality of members, determining preliminary activity geolocation concentrations at the member level associated with that member. A portion of the preliminary activity geolocation concentrations at the member level associated with that member having an activity concentration less than a predetermined threshold value is removed to generate the activity geolocation concentrations at the member level for that member.

FIG. 8 shows a flowchart of a method 900 to generate a set of trustworthiness scores for an activity based on a geolocation associated with the activity and an IP address associated with the activity, according to an embodiment. In some implementations, method 900 is performed by a processor (e.g., processor 410).

At 901, activity geolocation concentrations at an entity level and trustworthiness for a set of internet service providers (ISPs) at the entity level are learned for an entity having access to a plurality of independent cloud-based applications (e.g., SaaS applications 404a, 404b, and 404c). At 903, for each activity type included in a plurality of activity types and performed by at least one member account associated with (1) the entity and (2) at least one cloud-based application from the plurality of independent cloud-based applications, activity geolocation concentrations at an activity level for that activity type and trustworthiness for the set of ISPs at the activity level for that activity type are learned. At 905, for each member from a plurality of members associated with the entity, (1) activity geolocation concentrations at a member level associated with that member and (2) trustworthiness for the set of ISPs at the member level associated with that member are learned. 901, 903, and 905 can be performed in any sequence and/or in parallel.

At 907, a set of trustworthiness scores are generated for an activity, having an activity type included in the plurality of activity types and associated with a member from the plurality of members, based on (1) a geolocation associated with the activity, (2) at least one of the activity geolocation concentrations at the entity level, the activity geolocation concentrations at the activity level for the activity type, or the activity geolocation concentrations at the member level associated with the member, (3) an IP address associated with the activity, (4) an ISP associated with the IP address, and (5) at least one of the trustworthiness for the set of ISPs at the entity level, the trustworthiness for the set of ISPs at the activity level for the activity type, or the trustworthiness for the set of ISPs at the member level associated with the member.

Some implementations of method 900 further include determining that a trustworthiness score included in the set of trustworthiness scores is outside a first predetermined range but not outside a second predetermined range. The first predetermined range is associated with a first remedial action and the second predetermined range is associated with a second remedial action different than the first remedial action. Instructions are then sent to cause the first remedial action and not the second remedial action to occur in at least one of a network (e.g., network 406) associated with the entity, the plurality of independent cloud-based applications, or a compute device (e.g., compute device 402a, 402b and/or 402c) associated with the member.

Some implementations of method 900 further include determining that a trustworthiness score included in the set of trustworthiness scores is outside a predetermined range. In response to determining that the trustworthiness score is outside the predetermined range, a verification is made that the activity occurred over a period of time and distance relative to at least one of (1) a second activity performed before the activity, or (2) a third activity performed after the activity that is above a predetermined speed threshold. In response to the verifying, a signal is sent to cause a remedial action to occur.

FIG. 9 shows a flowchart of a method 1000 to detect impossible travel events using trusted geolocation clusters and trusted ISPs, according to an embodiment. In some implementations, method 1000 is performed by a processor (e.g., processor 410).

At 1001, for an entity having access to a plurality of independent cloud-based applications (e.g., SaaS applications 404a, 404b, 404c) and including a member having access to at least one cloud-based application from the plurality of independent cloud-based applications via at least one member account associated with the at least one cloud-based application, a plurality of activities performed using the at least one member account is analyzed with at least one machine learning model (e.g., ML models 414) configured to flag a first activity of a first activity type from the plurality of activities in response to at least one of (1) the first activity being associated with a geolocation outside at least one of (a) a trusted geolocation cluster at an entity level for the entity, (b) a trusted geolocation cluster at an activity level for the first activity type, or (c) a trusted geolocation cluster at a member level for the member, or (2) the first activity being associated with an internet service provider (ISP) not recognized as being at least one of (a) a trusted ISP at the entity level for the entity, (b) a trusted ISP at the activity level for the first activity type, or (c) a trusted ISP at the member level for the member.

At 1003, in response to the at least one machine learning model flagging the first activity, a verification is made that the first activity occurred over a period of time and distance relative to at least one of (1) a second activity from the plurality of activities performed before the first activity, or (2) a third activity from the plurality of activities performed after the first activity that is above a predetermined speed threshold.

Some implementations of method 1000 further include identifying, to generate a list of geolocations and for each activity performed at the plurality of independent cloud-based applications by a plurality of member accounts that (1) includes the at least one member account and (2) is associated with the entity, a geolocation associated with that activity. The list of geolocations are analyzed, using an unsupervised density-based machine learning model (e.g., ML models 414), to generate a set of trusted geolocation clusters at the entity level that includes the trusted geolocation cluster at the entity level.

Some implementations of method 1000 further include identifying, to generate a list of geolocations and for each activity (1) performed at the plurality of independent cloud-based application by a plurality of members accounts that (a) includes the at least one member account and (b) is associated with the entity and (2) is the first activity type, a geolocation associated with the activity. The list of geolocations are analyzed, using, for example, an unsupervised density-based machine learning model (e.g., ML models 414), to generate a set of trusted geolocation clusters at the activity level for the first activity type level that includes the trusted geolocation cluster at the activity level for the first activity type.

Some implementations of method 1000 further include identifying, to generate a list of geolocations and for each activity performed at the at least one cloud-based application by the at least one member account, a geolocation associated with that activity. The list of geolocations are analyzed, using an unsupervised density-based machine learning model (e.g., ML models 414), to generate a set of trusted geolocation clusters at the member level for the member that includes the trusted member cluster for the member.

Some implementations of method 1000 further include identifying, to generate a list of internet protocol (IP) addresses and for each activity performed at at least one application from the plurality of independent cloud-based applications by a plurality of member accounts that (1) includes the at least one member account and (2) is associated with the entity, an IP address associated with that activity. For each IP address included in the list of IP addresses, an ISP associated with that IP address is identified to generate a list of ISPs. The list of ISPs are analyzed to generate a set of trusted ISPs at the entity level that includes the trusted ISP at the entity level.

Some implementations of method 1000 further include identifying, to generate a list of IP addresses and for each activity (1) performed at the plurality of independent cloud-based application by a plurality of members accounts that (a) includes the at least one member account and (b) is associated with the entity and (2) is the first activity type, an IP address associated with the activity. For each IP address included in the list of IP addresses, an ISP associated with that IP address is identified to generate a list of ISPs. The list of ISPs are analyzed to generate a set of trusted ISPs at the activity level for the first activity type level that includes the trusted ISP at the activity level for the first activity type.

Some implementations of method 1000 further include identifying, to generate a list of IP addresses and for each activity performed at the at least one cloud-based application by the at least one member account, an IP address associated with that activity. For each IP address included in the list of IP addresses, an ISP associated with that IP address is identified to generate a list of ISPs. The list of ISPs are analyzed to generate a set of trusted ISPs at the member level for the member that includes the trusted ISP for the member.

Although portions of the above discussions were related to generating a trustworthiness score, additionally or alternatively, at least one untrustworthiness score can be generated (e.g., at the entity level, the activity level, and/or the member level). The untrustworthiness score can be determined using a similar logic outlined above for determining a trustworthiness score, but in the context of untrustworthiness. In some implementations, if an activity occurred at a location having a higher concentration of activities at the entity, activity, and/or member level, the activity is considered less untrustworthy (e.g., lower untrustworthiness score). In some implementations, if an activity occurred at a location having a lower concentration of activities at the entity, activity, and member level, the activity is considered more untrustworthy (e.g., higher untrustworthiness score). In some implementations, if an IP address is associated with (e.g., was performed using) an ISP having a relatively higher ISP trustworthiness score, the IP address can be assumed to be less untrustworthy (e.g., lower untrustworthiness score). In some implementations, if an IP address is associated with (e.g., was performed using) an ISP having a relatively lower ISP trustworthiness score, the IP address can be assumed to be more untrustworthy (e.g., higher untrustworthiness score).

In some implementations, the untrustworthiness score(s) is independent from the trustworthiness score(s) (e.g., the untrustworthiness score at an entity, activity, or member level is not one minus the trustworthiness score at that same level; the trustworthiness score at an entity, activity, or member level is not one minus the untrustworthiness score at that same level). Said similarly, the trustworthiness score(s) is not a function of the untrustworthiness score(s), and the untrustworthiness score(s) is not a function of the trustworthiness score(s). In some implementations, the untrustworthiness score(s) and trustworthiness score(s) are dependent on one another (e.g., the untrustworthiness score at an entity, activity, or member level is one minus the trustworthiness score at that same level; the trustworthiness score at an entity, activity, or member level is one minus the untrustworthiness score at that same level). Said similarly, the trustworthiness score(s) is a function of the untrustworthiness score(s), and the untrustworthiness score(s) is a function of the trustworthiness score(s). Thus, in some implementations of the techniques discussed herein (e.g., determining if a remedial action should occur, determining what remedial action should occur, etc.), the untrustworthiness score(s) can be used alone, the trustworthiness score(s) can be used alone, or a combination of the trustworthiness score(s) and untrustworthiness score(s) can be used.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the Figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
   determining (1) activity geolocation concentrations at an entity level and (2) IP address concentrations at the entity level for an entity having access to a plurality of independent cloud-based applications;
   determining, for each activity type from a plurality of activity types performed at the plurality of independent cloud-based applications and associated with the entity, (1) activity geolocation concentrations at an activity level for that activity type and (2) IP address concentrations at the activity level for that activity type;

determining, for each member from a plurality of members associated with the entity, (1) activity geolocation concentrations at a member level for that member and (2) IP address concentrations at the member level for that member;

generating at least one trustworthiness score for an activity, having an activity type and associated with a member from the plurality of members, based on: (1) a geolocation associated with the activity; (2) at least one of the activity geolocation concentrations at the entity level, the activity geolocation concentrations at the activity level for the activity type, or the activity geolocation concentrations at the member level for the member; (3) an IP address associated with the activity; (4) an ISP associated with the IP address; and (5) at least one of the IP address concentrations at the entity level, the IP address concentrations at the activity level for the activity type, or the IP address concentrations at the member level for the member; and in response to the at least one trustworthiness score being outside a predetermined range, sending an instruction to cause a remedial action in at least one of a network associated with the entity, an application from the plurality of independent cloud-based applications, or a compute device of a member associated with the entity.

2. The method of claim 1, further comprising:
identifying, to generate a list of geolocations and for each activity (1) performed at the plurality of independent cloud-based application and (2) associated with the entity, a geolocation associated with that activity; and
generating, using an unsupervised density-based machine learning model and based on the list of geolocations, the activity geolocation concentrations at the entity level.

3. The method of claim 1, further comprising,
for each activity type from the plurality of activity types:
identifying, to generate a list of geolocations and for each activity (1) performed at the plurality of independent cloud-based applications, (2) associated with the entity, and (3) being that activity type, a geolocation associated with that activity; and
generating, using an unsupervised density-based machine learning model and based on the list of geolocations, the activity geolocation concentrations at the activity level for that activity type.

4. The method of claim 1, further comprising,
for each member from the plurality of members:
identifying, to generate a list of geolocations and for each activity (1) performed at the plurality of independent cloud-based applications, (2) associated with the entity, and (3) performed via an account associated with that member, a geolocation associated with that activity; and
generating, using an unsupervised density-based machine learning model and based on the list of geolocations, the activity geolocation concentrations at the member level for that member.

5. The method of claim 1, further comprising:
identifying, to generate a list of IP addresses and for each activity (1) performed at the plurality of independent cloud-based application and (2) associated with the entity, an IP address associated with that activity; and
analyzing the list of IP addresses to generate the IP address concentrations at the entity level.

6. The method of claim 1, further comprising,
for each activity type from the plurality of activity types:
identifying, to generate a list of IP addresses and for each activity (1) performed at the plurality of independent cloud-based application, (2) associated with the entity, and (3) being that activity type, an IP address associated with that activity; and
analyzing the list of IP addresses to generate the IP address concentrations at the activity level for that activity type.

7. The method of claim 1, further comprising,
for each member from the plurality of members:
identifying, to generate a list of IP addresses and for each activity (1) performed at the plurality of independent cloud-based application, (2) associated with the entity, and (3) performed via an account associated with that member, an IP address associated with that activity; and
analyzing the list of IP addresses to generate the IP address concentrations at the member level for that member.

8. The method of claim 1, further comprising:
determining preliminary activity geolocation concentrations at the entity level; and
removing a portion of the preliminary activity geolocation concentration having an activity concentration less than a predetermined threshold value to generate the activity geolocation concentrations.

9. The method of claim 1, further comprising,
for each activity type from the plurality of activity types:
determining preliminary activity geolocation concentrations at the activity level for that activity type; and
removing a portion of the preliminary activity geolocation concentrations having an activity concentration less than a predetermined threshold value to generate the activity geolocation concentrations at the activity level for that activity type.

10. The method of claim 1, further comprising,
for each member from the plurality of members:
determining preliminary activity geolocation concentrations at the member level associated with that member; and
removing a portion of the preliminary activity geolocation concentrations at the member level associated with that member having an activity concentration less than a predetermined threshold value to generate the activity geolocation concentrations at the member level for that member.

11. A non-transitory processor-readable medium storing code representing instructions to be executed by one or more processors, the instructions comprising code to cause the one or more processors to:
learn activity geolocation concentrations at an entity level and trustworthiness for a set of internet service providers (ISPs) at the entity level for an entity having access to a plurality of independent cloud-based applications;
learn, for each activity type included in a plurality of activity types and performed by at least one member account associated with (1) the entity and (2) at least one cloud-based application from the plurality of independent cloud-based applications, activity geolocation concentrations at an activity level for that activity type and trustworthiness for the set of ISPs at the activity level for that activity type;
learn, for each member from a plurality of members associated with the entity, (1) activity geolocation concentrations at a member level associated with that member and (2) trustworthiness for the set of ISPs at the member level associated with that member; and generate a set of trustworthiness scores for an activity, having an activity type included in the plurality of activity types and associated with a member from the plurality of members, based on (1) a geolocation associated with the activity, (2) at least one of the activity geolocation concentrations at the entity level, the activity geolocation concentrations at the activity level for the activity type, or the activity geolocation concentrations at the member level associated with the member, (3) an IP address associated with the activity, (4) an ISP associated with the IP address, and (5) at least one of the trustworthiness for the set of ISPs at the entity level, the trustworthiness for the set of ISPs at the activity level for the activity type, or the trustworthiness for the set of ISPs at the member level associated with the member.

12. The non-transitory processor-readable medium of claim 11, wherein the code further comprises code to cause the one or more processors to:
  determine that a trustworthiness score included in the set of trustworthiness scores is outside a first predetermined range but not outside a second predetermined range, the first predetermined range associated with a first remedial action and the second predetermined range associated with a second remedial action different than the first remedial action; and
  send instructions to cause the first remedial action and not the second remedial action to occur in at least one of a network associated with the entity, the plurality of independent cloud-based applications, or a compute device associated with the member.

13. The non-transitory processor-readable medium of claim 11, wherein the code further comprises code to cause the one or more processors to:
  determine that a trustworthiness score included in the set of trustworthiness scores is outside a predetermined range;
  in response to determining that the trustworthiness score is outside the predetermined range, verify that the activity occurred over a period of time and distance relative to at least one of (1) a second activity performed before the activity, or (2) a third activity performed after the activity that is above a predetermined speed threshold; and
  in response to the verifying, send a signal to cause a remedial action to occur.

14. An apparatus, comprising:
  a memory; and
  a processor operatively coupled to the memory and configured to:
    for an entity having access to a plurality of independent cloud-based applications and including a member having access to at least one cloud-based application from the plurality of independent cloud-based applications via at least one member account associated with the at least one cloud-based application, analyze a plurality of activities performed using the at least one member account with at least one machine learning model configured to flag a first activity of a first activity type from the plurality of activities in response to at least one of (1) the first activity being associated with a geolocation outside at least one of (a) a trusted geolocation cluster at an entity level for the entity, (b) a trusted geolocation cluster at an activity level for the first activity type, or (c) a trusted geolocation cluster at a member level for the member, or (2) the first activity being associated with an internet service provider (ISP) not recognized as being at least one of (a) a trusted ISP at the entity level for the entity, (b) a trusted ISP at the activity level for the first activity type, or (c) a trusted ISP at the member level for the member; and
    in response to the at least one machine learning model flagging the first activity, verify that the first activity occurred over a period of time and distance relative to at least one of (1) a second activity from the plurality of activities performed before the first activity, or (2) a third activity from the plurality of activities performed after the first activity that is above a predetermined speed threshold.

15. The apparatus of claim 14, wherein processor is further configured to:
  identify, to generate a list of geolocations and for each activity performed at the plurality of independent cloud-based applications by a plurality of member accounts that (1) includes the at least one member account and (2) is associated with the entity, a geolocation associated with that activity; and
  analyze, using an unsupervised density-based machine learning model, the list of geolocations to generate a set of trusted geolocation clusters at the entity level that includes the trusted geolocation cluster at the entity level.

16. The apparatus of claim 14, wherein the processor is further configured to:
  identify, to generate a list of geolocations and for each activity (1) performed at the plurality of independent cloud-based application by a plurality of members accounts that (a) includes the at least one member account and (b) is associated with the entity and (2) is the first activity type, a geolocation associated with that activity; and
  analyze, using an unsupervised density-based machine learning model, the list of geolocations to generate a set of trusted geolocation clusters at the activity level for the first activity type level that includes the trusted geolocation cluster at the activity level for the first activity type.

17. The apparatus of claim 14, wherein the processor is further configured to:
  identify, to generate a list of geolocations and for each activity performed at the at least one cloud-based application by the at least one member account, a geolocation associated with that activity; and
  analyze, using an unsupervised density-based machine learning model, the list of geolocations to generate a set of trusted geolocation clusters at the member level for the member that includes the trusted geolocation cluster for the member.

18. The apparatus of claim 14, wherein the processor is further configured to:
  identify, to generate a list of internet protocol (IP) addresses and for each activity performed at at least one application from the plurality of independent cloud-based applications by a plurality of member accounts that (1) includes the at least one member account and (2) is associated with the entity, an IP address associated with that activity;
  identify, to generate a list of ISPs and for each IP address included in the list of IP addresses, an ISP associated with that IP address; and
  analyze the list of ISPs to generate a set of trusted ISPs at the entity level that includes the trusted ISP at the entity level.

19. The apparatus of claim 14, wherein the processor is further configured to:
- identify, to generate a list of IP addresses and for each activity (1) performed at the plurality of independent cloud-based application by a plurality of members accounts that (a) includes the at least one member account and (b) is associated with the entity and (2) is the first activity type, an IP address associated with the activity;
- identify, to generate a list of ISPs and for each IP address included in the list of IP addresses, an ISP associated with that IP address; and
- analyze the list of ISPs to generate a set of trusted ISPs at the activity level for the first activity type level that includes the trusted ISP at the activity level for the first activity type.

20. The apparatus of claim 14, wherein the processor is further configured to:
- identify, to generate a list of IP addresses and for each activity performed at the at least one cloud-based application by the at least one member account, an IP address associated with that activity;
- identify, to generate a list of ISPs and for each IP address included in the list of IP addresses, an ISP associated with that IP address; and
- analyze the list of ISPs to generate a set of trusted ISPs at the member level for the member that includes the trusted ISP for the member.

\* \* \* \* \*